(12) United States Patent
Gomar

(10) Patent No.: US 9,917,833 B2
(45) Date of Patent: Mar. 13, 2018

(54) SYSTEM AND METHOD FOR SPEAKER RECOGNITION ON MOBILE DEVICES

(71) Applicant: Cirrus Logic International Semiconductor Ltd., Edinburgh (GB)

(72) Inventor: Marta Garcia Gomar, Madrid (ES)

(73) Assignee: Cirrus Logic, Inc., Austin, TX (US)

( * ) Notice: Subject to any disclaimer, the term of this patent is extended or adjusted under 35 U.S.C. 154(b) by 183 days.

(21) Appl. No.: 14/720,712

(22) Filed: May 22, 2015

(65) Prior Publication Data

US 2015/0326571 A1 Nov. 12, 2015

Related U.S. Application Data

(63) Continuation of application No. 13/712,711, filed on Dec. 12, 2012, now Pat. No. 9,042,867.

(60) Provisional application No. 61/603,227, filed on Feb. 24, 2012.

(51) Int. Cl.
*H04L 29/06* (2006.01)
*H04W 12/06* (2009.01)
*G10L 17/22* (2013.01)
*G10L 17/00* (2013.01)

(52) U.S. Cl.
CPC .......... *H04L 63/0861* (2013.01); *G10L 17/00* (2013.01); *G10L 17/005* (2013.01); *G10L 17/22* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 5,893,057 A | * | 4/1999 | Fujimoto | G10L 17/00 704/246 |
| 8,442,824 B2 | * | 5/2013 | Aley-Raz | G10L 17/24 704/247 |
| 2001/0056349 A1 | * | 12/2001 | St. John | G07C 9/00158 704/270 |
| 2002/0167936 A1 | * | 11/2002 | Goodman | H04L 41/5003 370/352 |
| 2004/0236573 A1 | * | 11/2004 | Sapeluk | G10L 17/02 704/224 |
| 2005/0171851 A1 | * | 8/2005 | Applebaum | G06F 21/32 705/18 |

(Continued)

*Primary Examiner* — William Goodchild
(74) *Attorney, Agent, or Firm* — Jackson Walker L.L.P.

(57) ABSTRACT

A speaker recognition system for authenticating a mobile device user includes an enrollment and learning software module, a voice biometric authentication software module, and a secure software application. Upon request by a user of the mobile device, the enrollment and learning software module displays text prompts to the user, receives speech utterances from the user, and produces a voice biometric print. The enrollment and training software module determines when a voice biometric print has met at least a quality threshold before storing it on the mobile device. The secure software application prompts a user requiring authentication to repeat an utterance based at least on an attribute of a selected voice biometric print, receives a corresponding utterance, requests the voice biometric authentication software module to verify the identity of the second user using the utterance, and, if the user is authenticated, imports the voice biometric print.

23 Claims, 22 Drawing Sheets

(56) References Cited

U.S. PATENT DOCUMENTS

| | | | |
|---|---|---|---|
| 2005/0185779 A1* | 8/2005 | Toms | G10L 17/22 379/114.14 |
| 2010/0179813 A1* | 7/2010 | Summerfield | G10L 17/14 704/246 |
| 2011/0040561 A1* | 2/2011 | Vair | G10L 17/04 704/240 |

* cited by examiner

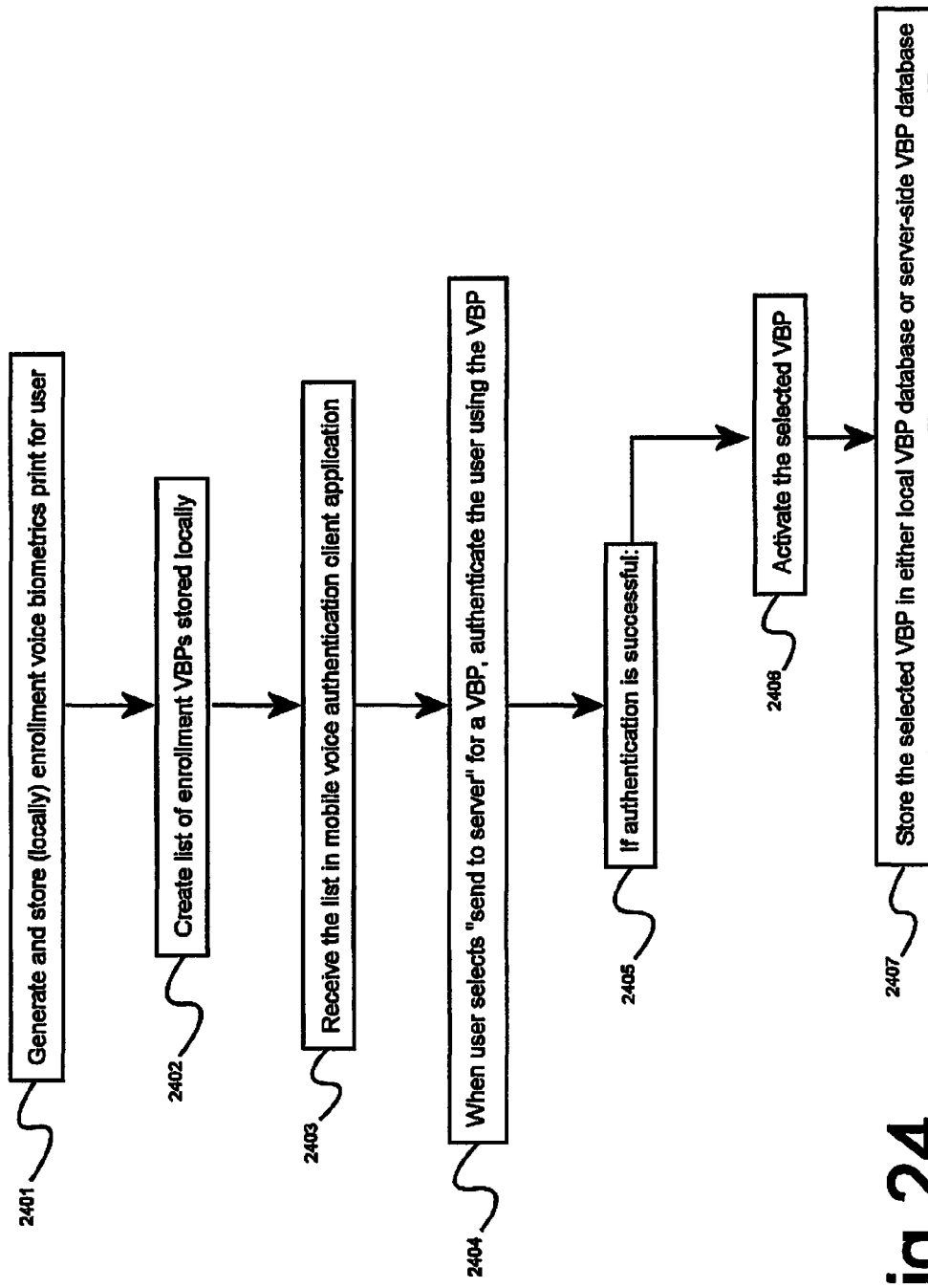

SYSTEM AND METHOD FOR SPEAKER RECOGNITION ON MOBILE DEVICES

RELATED APPLICATIONS

This application is a continuation of U.S. application Ser. No. 13/712,711 titled "SYSTEM AND METHOD FOR SPEAKER RECOGNITION ON MOBILE DEVICES", filed on Dec. 12, 2012, which claims priority U.S. Provisional Patent Application No. 61/603,227, filed Feb. 24, 2012, also entitled "SYSTEM AND METHOD FOR SPEAKER RECOGNITION ON MOBILE DEVICES", the entire specifications of each of which are hereby incorporated by reference in their entirety.

BACKGROUND OF THE INVENTION

Field of the Invention

The invention relates to the field of speaker recognition, and more particularly to the field of using voice biometrics to identify or authenticate speakers using a mobile device.

Discussion of the State of the Art

Identification and authentication of mobile phone users is an issue of significant importance, particularly because of the dramatic variety and rapid rate of adoption of mobile applications. As just one example, as new types of location-based services proliferate that allow users and business to connect and transact while one or both of them are mobile, it becomes more and more difficult to ensure the safety of such transactions. Simple authentication techniques, for example use of basic passwords, while possibly adequate in a time when web usage was primarily carried out by users on personal computers generally associated with fixed locations, are clearly inadequate today, when web usage mostly is occurring from a wide and expanding variety of mobile devices. For example, most mobile devices connect to the Internet in myriad different ways, many of which are far less secure than connecting via a dedicated home broadband connection, such as connecting via an unsecured WiFi at a coffee shop.

In the art, three main approaches have been used in securing interactions between users of computing devices and the various web-based services and content repositories they wish to access or use. These are shown, along with some examples, in FIG. 4. The first method can be referred to as authentication based on "something the user knows", or more formally as a first factor 403 based on a user's knowledge, such as a static password 404. The second approach can be referred to as authentication based on "something the user has", or more as a second factor 410 based on a user's possessing something that is his alone, such as a one-time password (OTP) 410 or a secure identification token 411. The third approach can be referred to as authentication based on "something the user is", or more formally as a third factor 420 based on a permanent biometric attribute of the user to be authenticated, such as a fingerprint 421. The axes in FIG. 4 represent increasing level of security along x axis 401 (that is, methods that are further to the right are generally more secure than those on their left), and a number of authentication factors along y axis 402. As shown in FIG. 4, the first factor 403 corresponding to what a user knows is the least secure of the three, with the second factor 410 corresponding to what a user has being more secure and the third factor 420 corresponding to what a user is being most secure. It is common in the art to combine two or three of these factors in various ways to achieve greater security. In general, an overall level of security is sought that is consistent with the value of the underlying activity and the damage that might occur if security measures for a given scenario were defeated by one or more malefactors. For example, it is quite common in national defense, counterterrorism, and law enforcement applications for three-factor authentication systems to be used, sometimes even featuring more than one type of biometrics (for example, combining fingerprint and voice-print identification).

FIG. 5 illustrates a typical example, known in the art, of knowledge-based authentication, which is a implemented as an extension of existing simple-password authentication. A user 520 initiates some action via interface 532 on a computing device such as a laptop computer 510 or a smart phone 511. Accordingly, the computing device sends a request via interface 531 to server 500, which returns an authentication request to the computing device, which requires user 520 to enter some previously agreed knowledge credential. If the user 520 enters the appropriate credential, she is allowed to carry out the requested action. Examples of knowledge-based authentication include Bank of America's "SiteKey" function, HSBC's virtual keyboard, and the like. This approach only improves on basic password-based authentication slightly, since it still is a single-factor approach and is carried out "in-band", that is using the same interface as is used to carry out the requested action (a usual example is a web browser, and a typical application would be online banking using laptop 510 or mobile device 511).

FIG. 6 illustrates a somewhat improved authentication approach that uses out-of-band communication, known as server-generated one-time password (OTP) authentication. Again, user 520 requests some action to be taken using interface 611 on laptop computer 510. The request is forwarded to a server 500 such as a web server, which determines that request is one that requires authentication of the user. Having previously stored information about user 520 (specifically, the user's mobile phone number in this example), server 500 sends a special code to the user's mobile device 511 in step 620. The user receives this special code in step 621 (typically a text-based code is displayed on the screen of the mobile device), and the user 520 then enters the special code in step 622 at laptop computer 510, which then sends the code to server 500 for authentication. This approach has the advantage of using two factors, one of which is carried out using a separate device (that is, out-of-band), and thus is stronger than the approach illustrated in FIG. 5.

FIG. 7 illustrates another common authentication approach used in the art, known as client-generated OTP. These are similar to conventional OTP tokens such as RSA™ SecurID, VeriSign™ VIP OTP, and the like. In this approach the user 520 again requests an action using interface 611 on laptop computer 510, the request the being sent on via interface 610 to server 500. Server 500 then sends an authentication request to the computer 510, which then requests a code from the user 520. The user 520 gets the code from her mobile device 511 via interface 620 (typically a special mobile application provided by the entity that operates server 500), and the user 520 enters the code on computer 510 in step 630 and the computer 510 sends the code on to the server 500 in step 631. Once the server 500 validates the code, the user 520 is authenticated and the server 500 performs the requested service. This approach is more secure than that shown in FIG. 6, as it is two-factor and does not depend on transmitting a one-time password on any public network. But it is still susceptible to man-in-the-middle attacks.

FIG. 8 shows yet another approach to authentication known in the art, known as out-of-band authentication. In this approach, user 520 requests an action on computer 510 via interface 811. The computer 510 then requests the action from server 500, which causes a phone call (or other out-of-band communication) to be initiated with the user's mobile device 511 via interface 820 (typically a mobile phone network). The user answers the call and using interface 821 is requested to authenticate for example using voice authentication. This approach is even more secure, since the authentication is separate from the browser on computer 510 and since a biometric factor is used. However, this approach is expensive since it requires phone calls to be made over public phone networks, and it is somewhat unwieldy from a usability perspective.

FIG. 9 illustrates an even newer approach to mobile authentication, which is refereed to as in-band mobile OTP authentication. In this case everything happens through mobile device 900, 910, using specialized authentication applications provided by an entity desiring to engage in secure interaction with its users (for example, AOL™, PayPal™, and eBay™ provide applications along these lines). Looking at mobile device 900, a token application 910 is displayed that functions much as secure tokens have done for some time, providing a time-based unique code to use as an OTP (it can be made unique because it is based on some hidden algorithm that is based on a universal time and an identity of the device on which the application is running, which device is associated with a single user). Similarly, mobile device 910 shows a variation in which a VIP Access application 920 is provided that displays both a credential ID 921 and a security code 922 to a user. These applications are useful, but they have two main drawbacks. First, they tend to be useful only for the purposes provided for by the provider of the application (for instance, a corporate IT department), so a user would potentially have to have several such applications available on her mobile device. Second, the approach is only as secure as the user's custody of their mobile device is; if the user misplaces her mobile device, security may not be as readily ensured (essentially, this is a two-factor approach based on what you have and what you know, but not based on what you are).

Another approach that has been used in the art is out-of-band mobile device-based authentication, which is essentially the use of a mobile device as a secure "what you have" authentication token. Several solutions are known in the art, such as those using iOS's APNS and Android's C2DM services. These can be used to provide a real-time out-of-band challenge and response mechanism on a mobile device. Upon performing a sensitive transaction or login, a user immediately receives a challenge pushed to her mobile device. She is then prompted with the full details of the proposed transaction, and is able to respond to approve or deny the transaction by simply pressing a button on her mobile phone. Smart phone push-oriented two-factor authentication is attractive because it is at once both more user-friendly and more secure than previous approaches.

Even though two-factor authentication provides significantly better security, organizations are discovering that as attacks increase in sophistication, the two-factor authentication is simply not enough. There are many challenges with the various OTP devices out in the market today. These challenges include weakness of static passwords, difficult to carry form factors, and insecure form factors.

The initial purpose of OTP and USB tokens was to strengthen the static password and to add an additional one-time password that was harder to obtain. The rationale behind the two-factor authentication approach was that user needed to have two different data elements, both secure, to access a secure region. The user usually chooses their individual static passwords. Most users have a tendency to choose a memorable combination of numbers and characters that is easy for the user to remember. The users may also write down their password in case they forget it. The combination of these reasons makes static passwords easily stolen or easily guessed by fraudsters. Now that the static password is no longer a secure data element, the only real data element that is preventing unauthorized entrance to secure regions is the OTP. This fact makes it easy for fraudsters to access unsecure regions simply by stealing OTP tokens.

Another challenging issue is that the OTP and USB tokens are hardware devices that are not easy to carry. Most OTP and USB devices are in from of tokens that are made to be a part of the key chain held by the end user. The market is leaning towards hardware that can be stored in the wallet and therefore this challenge may eventually be addressed. However, for now the majority of OTP tokens reside in a very clumsy form.

The last challenge that OTP tokens have is the fact that the token itself is not secure. All the tokens today are either time based (the token changes the one time password every x min/sec) or event based (the token changes the one time password every time a button is pressed on the token). There is no security measure taken when the one time password appears. This, theoretically, increases the chance that the token and static password could be stolen, compromising the security of the site.

Nevertheless, a better solution for the challenges above is to use another strong authentication method that addresses the "what you are" factor in a multi-factor authentication approach. The most common "what you are" solution is a biometric solution. The strong authentication market is reaching a point of understanding that the two elements of a two-factor authentication solution need to be "what you have" and "what you are" rather than "what you know" and "what you have". The reason for this change is the understanding that "what you know" data elements are no longer secure. Static passwords are easily stolen and gaining personal information regarding a certain individual is not a high barrier for fraudsters and identity thieves. This, and the fact that biometric authentication devices have become mature enough that it is possible for them to process biometric authentication with a very low false positive rate and at reasonable cost, make biometric authentication a valid and promising solution in the market.

Evaluating multi-factor authentication solutions requires a look at three critical areas—the security and scalability of the technology, hurdles to user adoption, and the total cost (including internal costs) to deploy and support the system. Because of the cost and complexity of most biometric systems, use of biometric authentication is generally limited to ultra high security applications (e.g. the defense industry). Historically, biometric systems have been a mixed bag when it comes to availability, compatibility, and security. Training is a significant issue and logistics are perhaps more difficult than with any other two-factor solution. Deployment involves collecting the biometric data to compare against, which can be a daunting task for users and IT departments. In addition, most biometric authentication solutions rely on fingerprint readers, retinal scanners, or other biometric devices, which are attached to the pc or laptop. The cost and IT resources required to purchase, deploy, and maintain biometric readers often presents an impractical challenge to surmount.

One approach to addressing these problems would be to use strong authentication such as through biometrics (that is, based on "what you are") carried out directly on a mobile device. However, in the current art speaker recognition approaches are still too heavy (resource intensive) to run on even very advanced capability mobile devices, so both voice print creation and comparison are typically performed on remote servers. This further means that audio collected on a mobile device must be transmitted through a data channel to a server, which creates a bandwidth problem, as well as the risk of a man in the middle attack. In fact, successful man-in-the-middle attacks may send recorded voice signals to a speaker recognition server, and thus, may be able to perform false authentication remotely. In general, codecs could be used to reduce the bandwidth required when sending voice signals, but in that case accuracy degradation would be expected.

What is needed in the art is a cost-effective voice biometric capability adapted for easy adoption and use on plural mobile devices per user. Such a capability must be capable of winning user trust, particularly in terms of being practically unbreakable. In addition, privacy concerns suggest an approach where there is no need for the centralized storage of large numbers of voice biometric prints, since breach of such a database would compromise potentially millions of voice biometric prints—a clearly undesirable situation since users cannot change their voices, and since voices can be duplicated (making voice biometrics potentially more vulnerable than fingerprint or retina biometrics). Furthermore, what is needed is a voice biometric capability that does not require much bandwidth to operate, and that is able to operate with acceptable accuracy on a wide range of mobile devices (which often suffer from limited memory or processing capacity relative to the demands of robust voice biometrics).

SUMMARY OF THE INVENTION

Accordingly, the inventors have conceived and reduced to practice, in a preferred embodiment of the invention, a system and method for speaker recognition on mobile devices.

In general, the system envisioned by the inventor addresses the shortcoming in the art addressed above in several ways. The inventors envision a mobile application that allows users to create and refine voice prints/models (voice "tokens"). According to the invention, users can practice, using the application, in order to build confidence in voice authentication (trying to be authenticated in different places and times, checking that other people is properly rejected etc). During the practice process, an original model can be also improved by means of different "learning" stages. According to the invention, different learning or improvement methods are provided in order to: (a) improve calibration, that is, adjust the threshold (many times there are score misalignments among different models/voice prints and the threshold must be "moved" in order to achieve the False Alarm and False Rejection rates required); (b) improve accuracy (adapting the model with new utterances, etc.); and automatically detect, during a practice stage, when an additional learning stage is required.

In another aspect of the invention, once a user is confident enough in voice authentication technology as realized on his mobile phone (for example, although any user device may be used according to the invention, and embodiments focused on mobile devices should be understood to be exemplary in nature, rather than limiting the scope of the invention), she may decide to use one of the voice prints created and exercised by means of the previous application in one or more third-party applications for authentication (a good example is mobile banking app). In the third party app, a user may choose which model/voice print wants to use. At the time a user chooses a model, a voice authentication will be required in order to ensure that the person who selects the model is the same person as the one who created it previously. If the authentication is positive, the model is activated/validated so it can be used for further voice authentication by the third-party mobile app. Moreover, the third-party app may either save the model locally (if authentication is going to be done locally) or send it to its own server, where the model is saved in a database (if authentication is going to be done remotely, in the server). Once the model is available and validated, the third-party app will be able to call the authentication solution of the invention in order to perform voice authentication when necessary.

When this happens, the requesting user will be requested to "speak" a phrase. The audio collected will be processed in order to extract statistics, as is common in the art of speaker recognition. If authentication is done locally (i.e., on a mobile or other user device), then the whole process (including iVector extraction from statistics and matching of voice biometric prints) may be carried within the mobile device. If authentication is done on a server, statistics extracted by a system according to the invention will be sent to the server to be compared with the previously stored model.

According to a preferred embodiment of the invention, a speaker recognition system operable to recognize or authenticate a user of a mobile device is disclosed. According to the embodiment, the system comprises an enrollment and learning software module stored and operable on a mobile device and adapted to receive speech utterances from a user via a microphone on the mobile device, a voice biometric authentication software module stored and operable on the mobile device, and a secure software application operable on the mobile device. According to the embodiment, upon request by a first user of the mobile device, the enrollment and learning software module displays a plurality of text prompts to the first user and receives speech utterances from the first user corresponding substantially to at least one of the plurality of text prompts and produces a voice biometric print therefrom; the enrollment and training software module determines when a voice biometric print has met at least a quality threshold before storing it on the mobile device; and the secure software application, on request, receives a list all available voice biometric prints from the enrollment and learning software module, displays at least a portion of the received list to a second user of the mobile device, receives a selection from the second user of a particular voice biometric print to be used by the secure software application, prompts the second user to repeat an utterance based at least on an attribute of the selected voice biometric print, receives an utterance from the second user, requests the voice biometric authentication software module to verify the identity of the second user based on the received utterance, and, if the voice biometric authentication software module verifies the identity of the second user, imports the voice biometric print.

According to another embodiment of the invention, the imported voice biometric print is stored on the mobile device by the secure software application, and the secure software application, when authentication of a third user of the secure software application is required, displays a plurality of text prompts to the third user and receives a plurality of speech utterances from the third user corresponding substantially to at least one of the plurality of text prompts and produces a voice biometric print therefrom, the voice biometric authentication software module analyzes the plurality of speech utterances to obtain thereby a new voice biometric print corresponding to the third user and compares the new voice biometric print corresponding to the third user to the first biometric voice print and, if an indicia of correspondence between the new voice biometric print and the first voice biometric print exceeds a threshold, authenticates the third user and provides privileged access to the third user.

According to a further embodiment of the invention, the enrollment and learning software module comprises a feature extraction module that extracts statistical data from a plurality of speech utterances received from an enrolling user using a universal background model, generates a most-valuable Gaussian based at least on the extracted statistical data, prunes a first set of statistics comprising one or more of a total variability matrix T, the extracted statistical data, or the universal background model in order to reduce data storage and processing required for speaker recognition, and generates a voice biometric print corresponding to the enrolling user, and the voice biometric authentication software module comprises a feature extraction module that extracts statistical data from a plurality of speech utterances received from the third user using a universal background model, generates a most-valuable Gaussian based at least on the extracted statistical data, prunes a second set of statistics comprising one or more of a total variability matrix T, the extracted statistical data, or the universal background model using the same pruning in order to reduce data storage and processing required for speaker recognition, wherein the second set of statistics is identical to the first set of statistics pruned by the enrollment and learning module, and generates a voice biometric print corresponding to the third user.

According to yet another embodiment of the invention, the voice biometric authentication software module determines when a voice biometric print has met at least a quality threshold before storing it on the mobile device.

According to an embodiment of the invention, the imported voice biometric print received by the secure software application is transmitted by the secure software application over a network to a remote voice authentication service associated with and accessible by the secure software application; the enrollment and learning software module comprises a feature extraction module that extracts statistical data from a plurality of speech utterances received from an enrolling user using a universal background model, generates a most-valuable Gaussian based at least on the extracted statistical data, prunes a first set of statistics comprising one or more of a total variability matrix T, the extracted statistical data, or the universal background model in order to reduce data storage and processing required for speaker recognition, and generates a voice biometric print corresponding to the enrolling user; the voice biometric authentication software module comprises a feature extraction module that extracts statistical data from a plurality of speech utterances received from the third user using a universal background model, generates a most-valuable Gaussian based at least on the extracted statistical data, prunes a second set of statistics comprising one or more of a total variability matrix T, the extracted statistical data, or the universal background model using the same pruning in order to reduce data storage and processing required for speaker recognition, wherein the second set of statistics is identical to the first set of statistics pruned by the enrollment and learning module, generates a voice biometric print corresponding to the third user, and the secure software application sends the voice biometric print corresponding to the third user to the remote voice authentication service; and the secure software application receives an authentication result from the remote voice authentication service that is based at least on the voice biometric print corresponding to the third user.

According to another embodiment of the invention, the imported voice biometric print received by the secure software application is transmitted by the secure software application over a network to a remote voice authentication service associated with and accessible by the secure software application; the secure software application sends the plurality of speech utterances received from the third user to the remote voice authentication service; and the secure software application receives an authentication result from the remote voice authentication service that is based at least on the voice biometric print corresponding to the third user.

According to a further embodiment of the invention, the enrollment and learning software module determines whether a voice biometric print has met a quality threshold by one of: (a) determining whether the plurality of speech utterances from which the voice biometric print is generated comprises at least a specific total speech time, (b) determining whether the plurality of speech utterances from which a voice biometric print is generated displays at least a minimum level of either vocal intensity or vocal variability, or both, and (c) determining whether a noise level present in the plurality of speech utterances from which a voice biometric print is generated exceeds a maximum peak or average value.

According to another embodiment of the invention, a visual indication is provided to a user of whether more speech time is needed to obtain a voice biometric print of sufficient quality.

According to a further embodiment of the invention, the voice biometric authentication software module determines whether a voice biometric print has met a quality threshold by one of: (a) determining whether the plurality of speech utterances from which the voice biometric print is generated comprises at least a specific total speech time, (b) determining whether the plurality of speech utterances from which a voice biometric print is generated displays at least a minimum level of either vocal intensity or vocal variability, or both, (c) determining whether a noise level present in the plurality of speech utterances from which a voice biometric print is generated exceeds a maximum peak or average value, and (d) determining whether a signal to noise ratio present in the plurality of speech utterances exceeds some minimum threshold.

In another embodiment of the invention, a visual indication is provided to a user of whether more speech time is needed to obtain a voice biometric print of sufficient quality.

According to a preferred embodiment of the invention, a method for recognizing or authenticating a user of a mobile device is disclosed. The method comprises the steps of: (a) upon receipt of a request from a first user of a mobile device to enroll in a speaker recognition system, the request being received at an enrollment and learning software module stored and operating on the mobile device, the enrollment and learning module displays a first plurality of text prompts to the first user; (b) receiving a first plurality of speech utterances from the first user corresponding substantially to at least one of the first plurality of text prompts; (c) extracting one or more voice feature data components from the first plurality of speech utterances in a feature extraction software module operating with or a component of the enrollment and learning module; (d) generating a set of statistics pertaining to the voice feature data components using a universal background model; (e) executing, in the enrollment and learning software module, one or more pruning operations to reduce the size of intermediate data objects to reduce any of processor usage, memory usage, or bandwidth usage; (f) extracting a voice biometric print from the set of statistics using at least a total variability matrix; (g) determining when an extracted voice biometric print has met at least a quality threshold; and (h) if the quality threshold step (g) was met, storing the voice biometric print on the mobile device.

According to another embodiment of the invention, the method further comprises the steps of: (i) receiving, at a secure software application stored and operating on the mobile device, a list all available voice biometric prints from the enrollment and learning software module; (j) displaying at least a portion of the received list to a second user of the mobile device; (k) receiving from the second user a selection of a particular voice biometric print to be used by the secure software application; (l) prompting the second user to repeat an utterance based at least on an attribute of the selected voice biometric print; (m) receiving an utterance from the second user; (n) requesting a voice biometric authentication software module stored and operating on the mobile device to verify the identity of the second user based on the received utterance; and (o) if the voice biometric authentication software module verifies the identity of the second user, importing the voice biometric print into the secure software application.

According to another embodiment of the invention, the method further comprises the steps of: (m) storing the imported voice biometric print on the mobile device by the secure software application; (n) when authentication of a third user of the secure software application is required, displaying a plurality of text prompts to the third user; (o) receiving a plurality of speech utterances from the third user corresponding substantially to at least one of the plurality of text prompts; (p) producing a voice biometric print from the received plurality of speech utterances; (q) analyzing the plurality of speech utterances to obtain thereby a new voice biometric print corresponding to the third user; (r) comparing the new voice biometric print corresponding to the third user to the first biometric voice print; and (s) if an indicia of correspondence between the new voice biometric print and the first voice biometric print exceeds a threshold, authenticating the third user and providing privileged access to the third user.

According to yet another embodiment of the invention, the methods described above are characterized in that the enrollment and learning software module comprises a feature extraction module that extracts statistical data from a plurality of speech utterances received from an enrolling user using a universal background model, generates a most-valuable Gaussian based at least on the extracted statistical data, prunes a first set of statistics comprising one or more of a total variability matrix T, the extracted statistical data, or the universal background model in order to reduce data storage and processing required for speaker recognition, and generates a voice biometric print corresponding to the enrolling user; and the voice biometric authentication software module comprises a feature extraction module that extracts statistical data from a plurality of speech utterances received from the third user using a universal background model, generates a most-valuable Gaussian based at least on the extracted statistical data, prunes a second set of statistics comprising one or more of a total variability matrix T, the extracted statistical data, or the universal background model using the same pruning in order to reduce data storage and processing required for speaker recognition, wherein the second set of statistics is identical to the first set of statistics pruned by the enrollment and learning module, and generates a voice biometric print corresponding to the third user.

According to another embodiment of the invention, the method further comprises the steps of: (m) transmitting the imported voice biometric print received by the secure software application over a network to a remote voice authentication service associated with and accessible by the secure software application; (n) sending the plurality of speech utterances received by the secure software application from the third user to the remote voice authentication service; and (o) receiving, at the secure software application, an authentication result from the remote voice authentication service that is based at least on the voice biometric print corresponding to the third user.

According to yet another embodiment of the invention, the methods described above are characterized in that the enrollment and learning software module determines whether a voice biometric print has met a quality threshold by one of: (a) determining whether the plurality of speech utterances from which the voice biometric print is generated comprises at least a specific total speech time, (b) determining whether the plurality of speech utterances from which a voice biometric print is generated displays at least a minimum level of either vocal intensity or vocal variability, or both, and (c) determining whether a noise level present in the plurality of speech utterances from which a voice biometric print is generated exceeds a maximum peak or average value.

According to yet another embodiment of the invention, the methods described above are characterized in that a visual indication is provided to a user of whether more speech time is needed to obtain a voice biometric print of sufficient quality.

According to yet another embodiment of the invention, the methods described above are characterized in that the voice biometric authentication software module determines whether a voice biometric print has met a quality threshold by one of: (a) determining whether the plurality of speech utterances from which the voice biometric print is generated comprises at least a specific total speech time, (b) determining whether the plurality of speech utterances from which a voice biometric print is generated displays at least a minimum level of either vocal intensity or vocal variability, or both, (c) determining whether a noise level present in the plurality of speech utterances from which a voice biometric print is generated exceeds a maximum peak or average value, and (d) determining whether a signal to noise ratio present in the plurality of speech utterances exceeds some minimum threshold.

According to yet another embodiment of the invention, the methods described above are characterized in that a visual indication is provided to a user of whether more speech time is needed to obtain a voice biometric print of sufficient quality.

According to a preferred embodiment of the invention, a mobile computing device comprising a microphone; an enrollment and learning software module adapted to receive speech utterances from a user via the microphone; a voice biometric authentication software module; and a secure software application with a multimodal interface is disclosed. According to the embodiment, upon request by a user of the mobile computing device, the enrollment and learning software module displays a plurality of text prompts to the user and receives speech utterances from the user corresponding substantially to at least one of the plurality of text prompts and produces a voice biometric print therefrom; the enrollment and training software module determines when a voice biometric print has met at least a quality threshold before exporting the voice biometric print to the secure software application; the enrollment and learning software module comprises a feature extraction module that extracts statistical data from a plurality of speech utterances received from an enrolling user using a universal background model, generates a most-valuable Gaussian based at least on the extracted statistical data, prunes one or more of a total variability matrix T, the extracted statistical data, or the universal background model in order to reduce data storage and processing required for speaker recognition, and generates a voice biometric print corresponding to the enrolling user; and the secure software application, on request, receives a list all available voice biometric prints from the enrollment and learning software module, displays at least a portion of the received list to a second user of the mobile device, receives a selection from the second user of a particular voice biometric print to be used by the secure software application, prompts the second user to repeat an utterance based at least on an attribute of the selected voice biometric print, receives an utterance from the second user, requests the voice biometric authentication software module to verify the identity of the second user based on the received utterance, and, if the voice biometric authentication software module verifies the identity of the second user, imports the voice biometric print.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 24 is a process flow diagram of a method for allowing a user to transfer a selected voice biometric print to a third party application or device, according to an embodiment of the invention.

DETAILED DESCRIPTION

Figure 1:
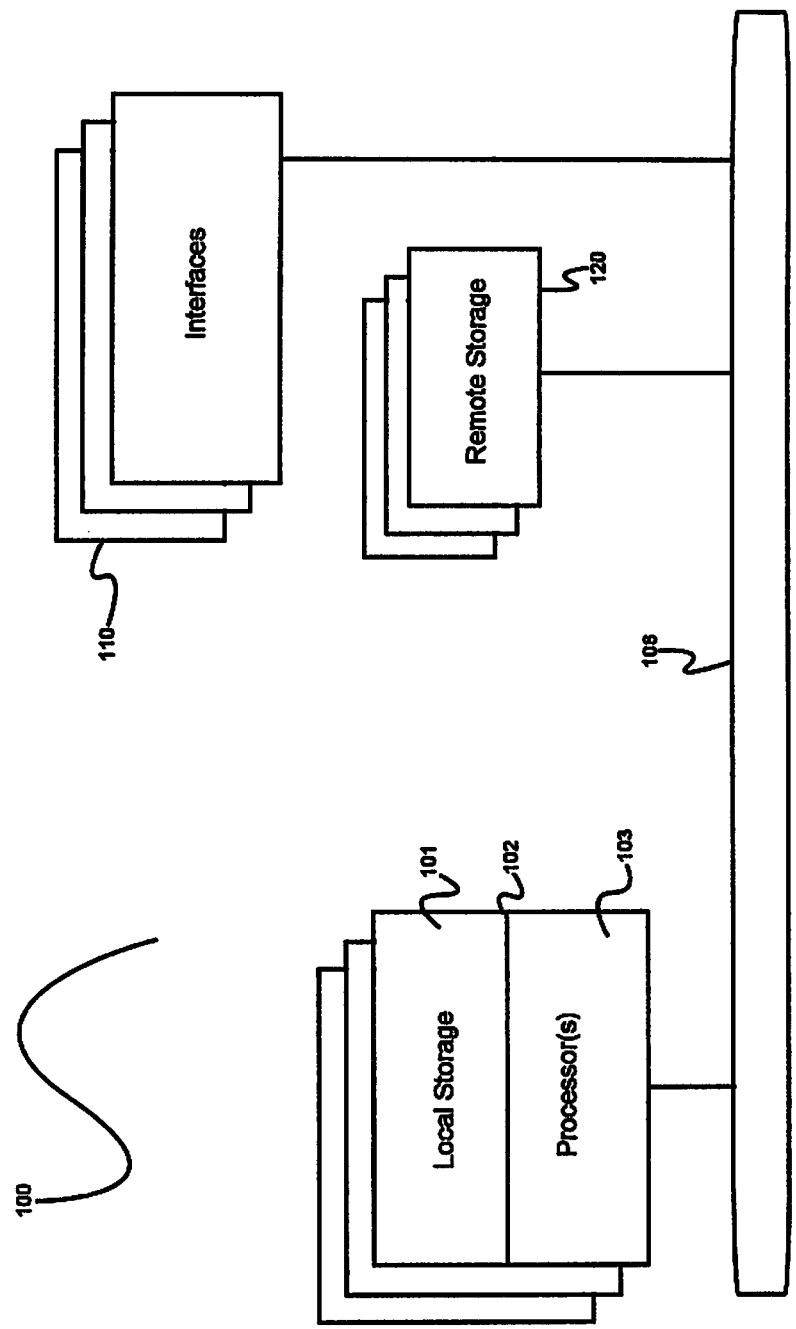
FIG. 1 is a block diagram illustrating an exemplary hardware architecture of a computing device used in an embodiment of the invention.

The inventors have conceived, and reduced to practice, a system and various methods for speaker recognition, authentication, or identification that addresses the shortcomings of the prior art that were discussed in the background section.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified other wise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Furthermore, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of the embodiments of the present invention in which for example functions may be executed out of order from that shown or discussed, including substantially concurrently or in reverse order, depending on the functionality involved, as would be understood by those having ordinary skill in the art.

Many embodiments described herein may be described in terms of "software", "modules", "applications", and the like. It should be appreciated by one having ordinary skill in the art that any components or steps described thus may in fact be implemented purely as software programs, as special purpose software tied to particular hardware (for instance, as a device driver), as a mixed software/hardware component, or as a specifically-designed hardware component that carries out the logical function being described. For instance, feature extraction module 1012, which is described below with reference to FIG. 10, may be implemented as an application-specific integrated circuit (ASIC), as a field-programmed gate array (FPGA), as an assembly language routine included in a piece of firmware associated with a dedicated electronic device that performs speaker recognition, as an operating system kernel-level component in a specially-designed secure operating system that requires speaker recognition as part of a login process, or as a "conventional" software application running on one processor or implemented and invoked in a distributed form across many processors (the identities of which may vary over time as processors are added or dropped from a distributed speaker recognition system). Similarly, such modules or applications may be stored in one location or on one physical device, and run on one or more devices that may or may not include the device on which the software is stored. Also, software as used herein could refer to software running on a single machine with one processor, a multiprocessor machine, a distributed cluster of machines, or any combination of virtual machines. It will be appreciated by one having ordinary skill in the art of distributed computing and advanced software architectures that any of these—or indeed any other—method known in the art for operating complex software systems in modern operating environments may be used to implement embodiments of the invention without departing from the scope of the invention. However, it should equally be obvious to one having ordinary skill in the art of speaker recognition systems that none of the modules, applications, methods, or systems described herein are amenable to being performed mentally in any way. While human beings are more adept than computers at recognizing voices (it is a fundamental aspect of our biology), humans are not capable of carrying out, even with pen and paper or calculators, the types of computations described herein, and any inference that the systems and methods described and claimed herein may be drawn to abstract ideas would be recognized by any one having any level of skill in the art of automated speaker recognition as expressly fallacious.

Definitions

The term "speaker recognition" is also sometimes referred to as "speaker authentication", "voice authentication", "voice recognition", or "speaker identification", among other synonyms (although "speaker identification usually is taken to refer to a slightly different case, where one tries to identify who a speaker is by analyzing features of the person's voice, as opposed to authentication/recognition, which is generally concerned with determining whether an individual is who she claims she is; nevertheless, techniques described herein may be used for either purpose). As used herein, "speaker recognition" refers technologies and methods that have, as a primary goal, the recognition of the speaker of a set of spoken utterances. For example, it may be important to know if a person who says, "I am Tom Weaver" actually is Tom Weaver. Typical speaker recognition systems comprise an enrollment process, where speakers who are later to be recognized first enroll with the system and provide one or more speech samples. The speech samples are analyzed in order to extract a voice biometric print, which can be stored. Later, when an enrolled speaker needs to be identified or authenticated (for example, when an enrolled speaker seeks access to a sensitive system), the enrolled speaker will be asked to speak a test phrase. The test phrase is then analyzed to extract a voice biometric print, and the test print is compared to the print created at enrollment time, and if the two prints are sufficiently equivalent, access is granted. In some speaker recognition systems, the test phrase is predetermined and must be spoken exactly as provided (this is usually referred to as text-dependent speaker recognition); in other cases, a speaker may be allowed to say anything that comes to mind, and a voice biometric print is created from the entirely unknown test phrase (this is known as text-independent speaker recognition). In some cases, text-independent speaker recognition is performed without the knowledge of the speaker being identified (clearly text-dependent speaker recognition would not be helpful in covert identifications).

A "mobile computing device" is a device such as a tablet computing device, mobile phone, smartphone, laptop, and the like, a consumer electronic device such as a music player, portable gaming device, or the like, or any other suitable electronic device that generally is portable by a user and is typically used in more than one location, or any combination thereof.

A "speech input software module" is a unit of executable software code, whether machine code, byte code, or scripting code, that is interfaced with a microphone or similar audio input device and adapted to collect digital audio data corresponding to actual speech uttered by a user.

A "speech utterance" is a typically (but not necessarily) short digital sample of spoken speech, and is the smallest unit of raw audio data that is normally analyzed in speaker recognition and other speech analysis systems.

A "feature vector extraction module" is a unit of executable software code, whether machine code, byte code, or scripting code, that takes one or more speech utterances as input and extracts statistical features or characteristics of the speech, using one or more of a large number of well-established techniques known in the art.

A "data pruning step" is a process step that comprises a number of executable software-based operations that lead to the removal of a substantial portion of data input to the step, and that passes the remaining data (that is, the retained data) through to its output stage substantially unchanged.

A "speaker recognition software module" is a unit of executable software code, whether machine code, byte code, or scripting code, that carries out a process of automated speaker recognition, in general by comparing a voice biometrics print obtained from a set of speech utterances provided by a person requiring authentication to a previously stored voice biometrics print associated with the purported identity of the person seeking authentication, and determining whether the two voice biometrics prints are sufficiently alike to confirm that the person is indeed who he purports to be.

A "prompt" is a spoken or text-based phrase which is provided to a user in order to prompt the user to utter the specific phrase.

A set of "voice feature data" is a representation of the statistic characteristics of a specific voice that are useful for speaker recognition. Usually, voice feature data may model vocal track information, formants, pitch, and so forth. In the state of the art, many kinds of feature vectors have been used. A common form of voice feature data is a plurality of Gaussian mixed models that each represent mathematically specific components of the speech represented.

"Authentication" refers to a process of verifying that something is what it purports to be. For the purposes of understanding the instant invention, what is to be authenticated is generally an identity of a person, and "voice authentication" means specifically the use of biometric analysis of the person's voice to determine if it matches a previously stored biometric analysis of the person's voice (the previously stored analysis is usually done during enrollment, and generally involved added steps to make sure that only the person whose voice is to be analyzed is the one who utters the voice utterances that are analyzed).

A "voice biometric print" is a data file or other data element that comprises a set of numerical factors that collectively characterize the physical attributes of the vocal channel of the person and/or other characteristics from whom the voice biometric print was taken. It is analogous to a fingerprint, in that it represents a more or less permanent feature of who the subject person is (although voice biometric prints may vary with age, health issues, or background noise).

An "iVector" is a fixed-length, low-dimensional vector that is extracted for each utterance of a speech sample based on the notion of estimating latent variables corresponding to a high-variability subspace. It is commonly used as a voice biometric print.

A "voice biometric print storage module" is a unit of executable software code, whether machine code, byte code, or scripting code, that receives and stores a plurality of voice biometric prints. Storage may be in a standard relational database system, any other database system, flat files, or even in random access memory, and may be local or distributed across a number of network-resident storage devices. As such, the voice biometric storage module is the component whose responsibility it is to receive requests to store new voice biometric prints and to satisfy those requests by appropriately storing the received voice biometric prints; and to receive requests for previously stored voice biometric prints and to satisfy those requests by retrieving the associated voice biometric prints and providing them to the requesting user or application (for example, a voice biometric print could be provided to a third party mobile banking application, allowing it to improve security of mobile banking without its having to maintain its own voice authentication infrastructure).

An "enrollment software module" is a unit of executable software code, whether machine code, byte code, or scripting code that manages an enrollment process.

An "enrollment process" is a process that enrolls users in a voice authentication system, generally by prompting the users to speak one or more specific phrases (provided as prompts to the users), and then by analyzing the speech utterances provided to develop one or more voice biometrics prints corresponding to the users. In some cases, users are provided with the ability to select their own phrases to use during enrollment; in such cases, the system remembers the user-selected phrase and then prompts the user to speak it during authentication.

A "voice biometric print generator software module" is a unit of executable software code, whether machine code, byte code, or scripting code, that receives either a set of raw audio corresponding to a set of speech utterances from a person, or a set of extracted voice feature data (in some embodiments, feature extraction is performed within a voice biometric print generator software module, whereas in other embodiments feature extraction is performed separately and the voice biometric print generator software module receives an extracted feature set as input rather than raw speech audio data), and then computes a voice biometric print based on the received data.

A "universal background model" is a mathematical model that represents general, person-independent utterance-independent feature characteristics. In general, it is used by comparing it against a model of person-specific feature vector characteristics when making an "accept or reject" decision in voice biometrics authentication or recognition applications. Universal background models usually are mixtures of Gaussians (GMM), so that feature vectors of many speakers (generally speaking very different phrases) are modeled by a set of probabilistic density functions, which are Gaussians.

A "total variability matrix" is a matrix that contains the eigenvectors with the largest eigenvalues of a total variability covariance matrix. More simply, it is a matrix whose columns span a subspace where the most significant speaker and session variability is confined, and thus is used to characterize the degree to which a given speaker's voice is likely to vary from like utterance to like utterance within a session and over longer periods of time (if data is available for longer periods of time).

A "Gaussian" as used in speaker verification systems refers to one component of a Gaussian mixture model (GMM), which is a statistical model usually used to represent feature vectors in speaker recognition.

A "most valuable Gaussian" set is a set of Gaussians that collectively account for a substantial amount of the overall cumulative distribution function modeling a set of speech utterances. That is, if a threshold is set at 80%, then the set of most valuable Gaussians is those Gaussians, ranked in order of their individual probabilities of occurrence, whose total probabilities add up to greater than 80%. In general, the higher the threshold value is set in computing a set of most valued Gaussians, the smaller the benefit to be obtained from discarding the excess Gaussians, and the higher the overall accuracy of speaker recognition using the resulting set of most valuable Gaussians will be. The inventors have determined experimentally that a threshold level of 80% results in significant efficiency improvements without any noticeable drop in recognition accuracy.

In speaker recognition a "false accept" is a test result that incorrectly authenticates or identifies a person despite the fact that the person is an impostor. Similarly, a "false reject" is a test result that incorrectly rejects a speaker as not being who she claims she is, despite the fact that she is in fact who she says she is. Maintaining low false accept and false reject rates is one of the essential design requirements of any speaker recognition system. In fact, from a user's perspective, both false accepts and false rejects are considered unsatisfactory outcomes (in a false accept situation, an impostor may obtain access to a person's sensitive information or applications, while in a false reject situation, a person who should be granted access to a system or to specific data is denied such access, which may stop that person from carrying out some essential task—imagine for example being in a foreign country and having an automated teller machine reject your use of your own card), although there may be use cases where this is not necessarily the case.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
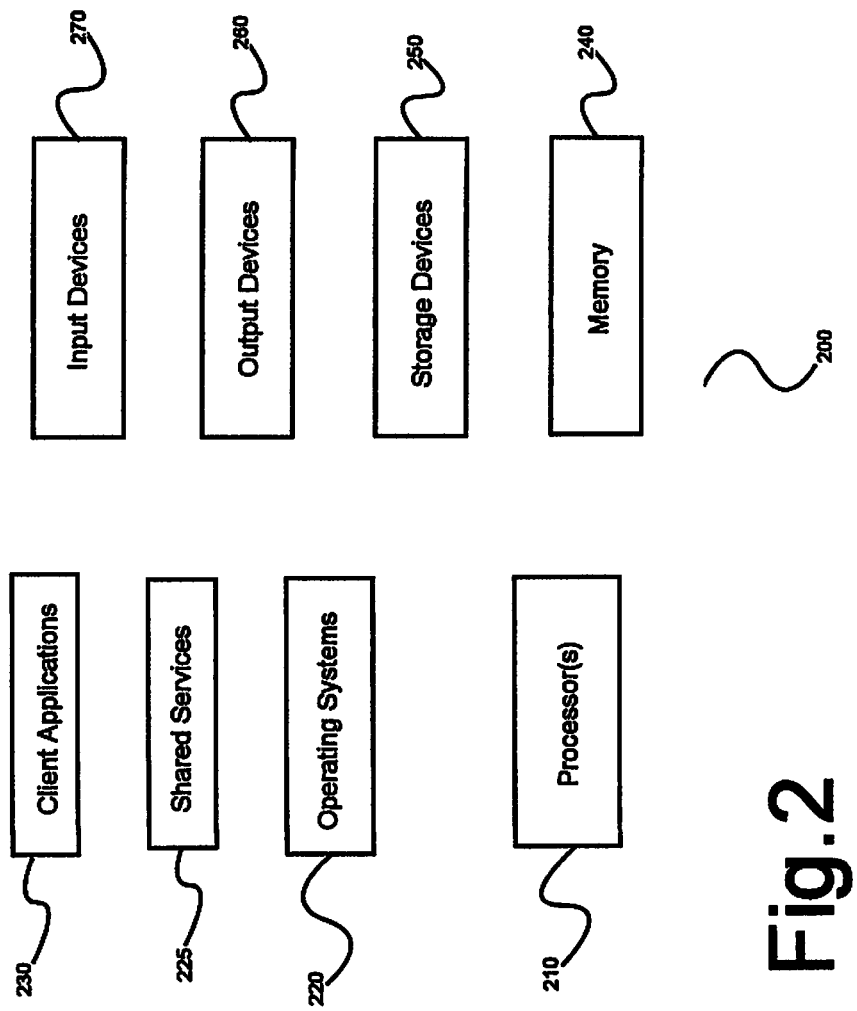
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
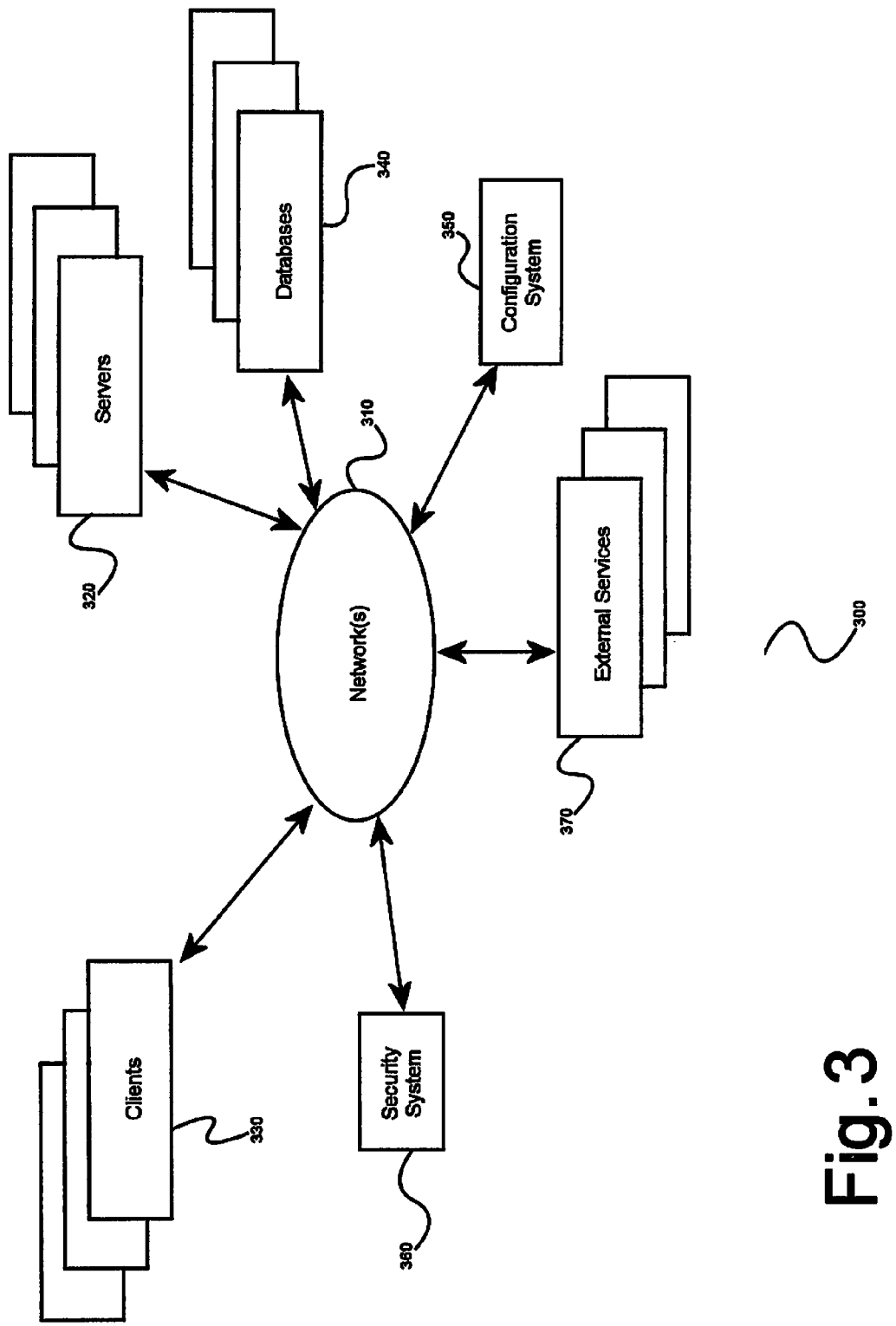
FIG. 3 is a block diagram showing an exemplary architectural arrangement of clients, servers, and external services, according to an embodiment of the invention.
Figure 4:
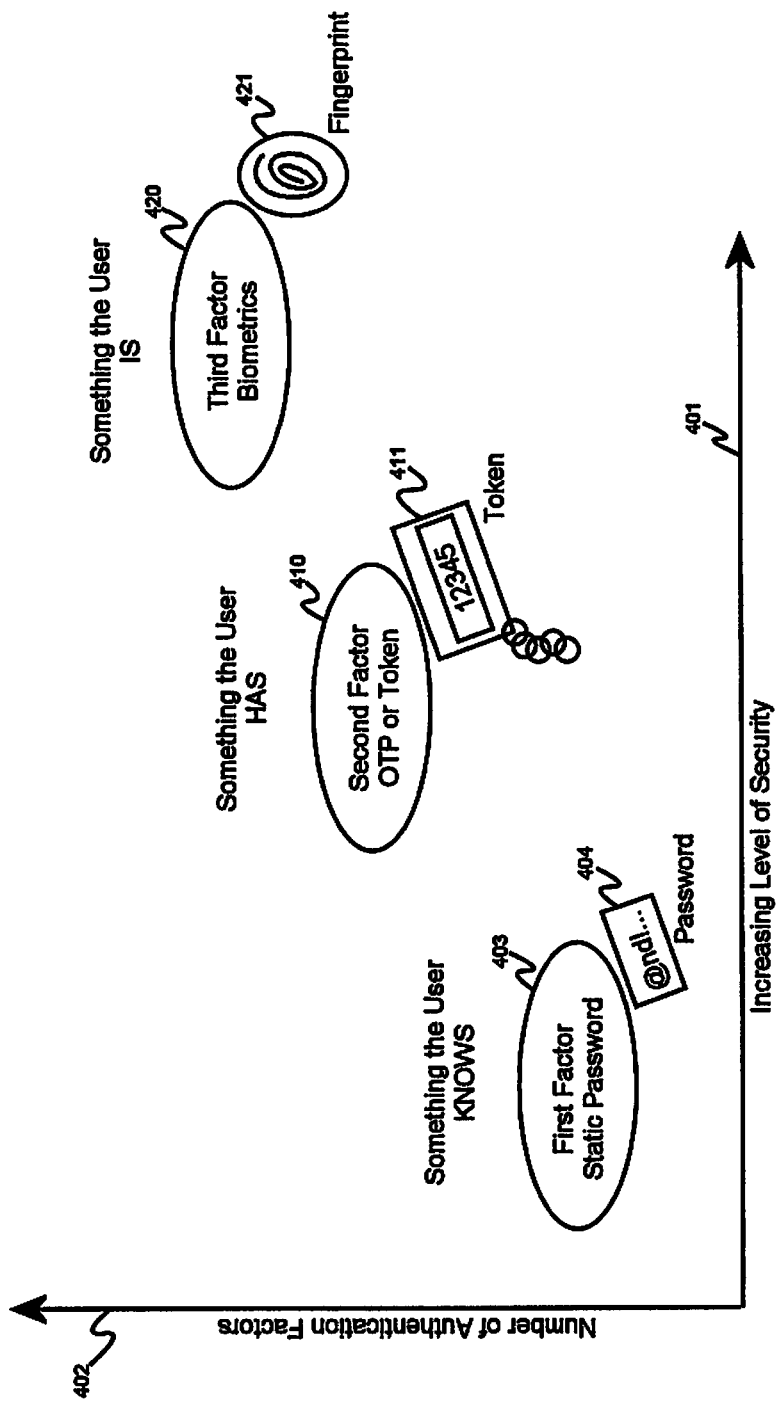
FIG. 4 (Prior Art) is a graph illustrating relationships between three leading methods of user identification or authentication.
Figure 5:
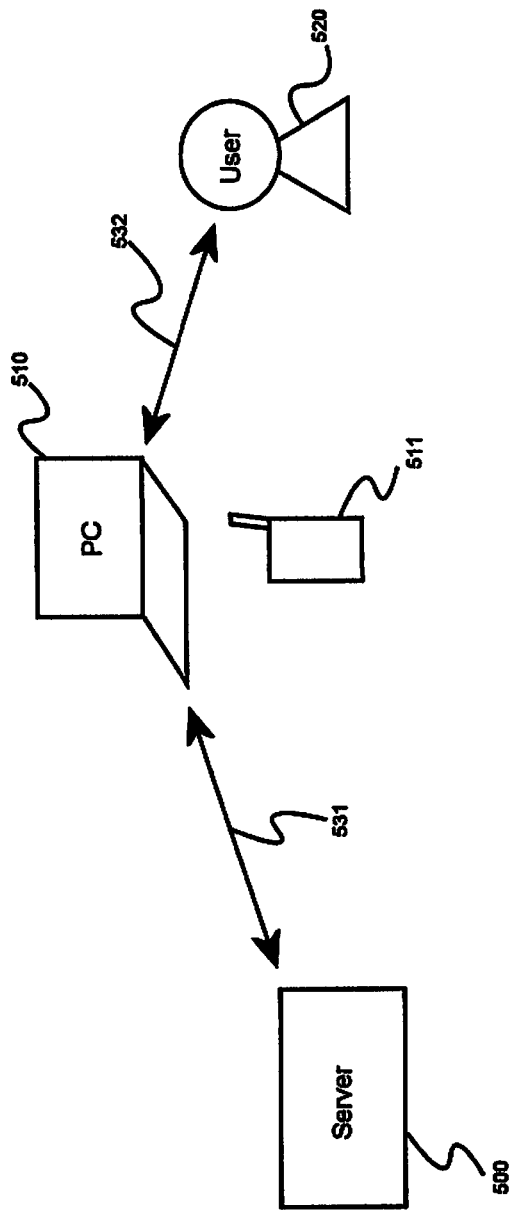
FIG. 5 (Prior Art) is a diagram illustrating the prior art technique of knowledge-based authentication.
Figure 6:
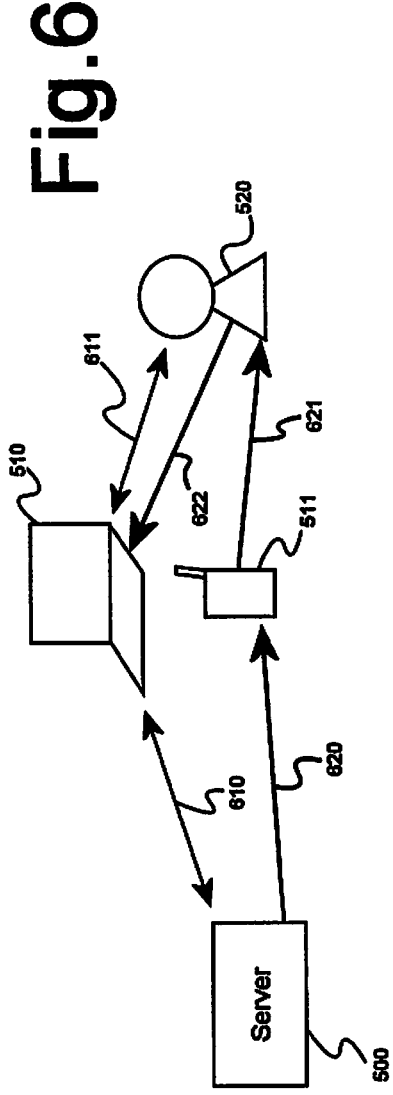
FIG. 6 (Prior Art) is a diagram illustrating the prior art technique of server-based one-time-password (OTP) authentication.
Figure 7:
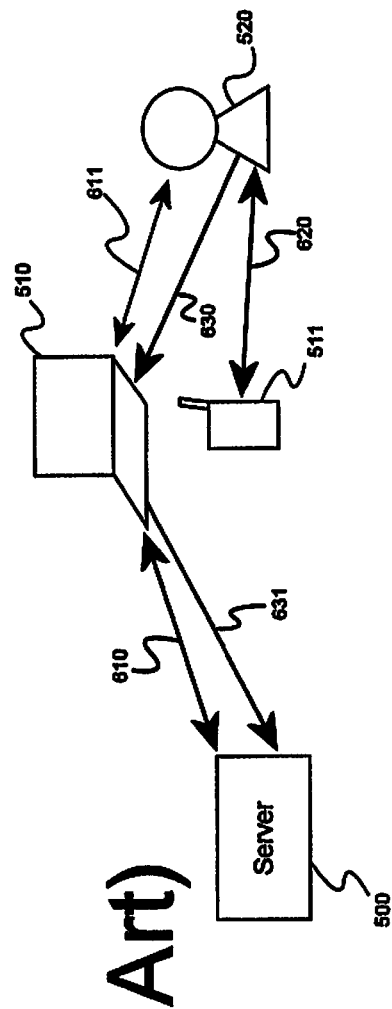
FIG. 7 (Prior Art) is a diagram illustrating the prior art technique of client-generated OTP authentication.
Figure 8:
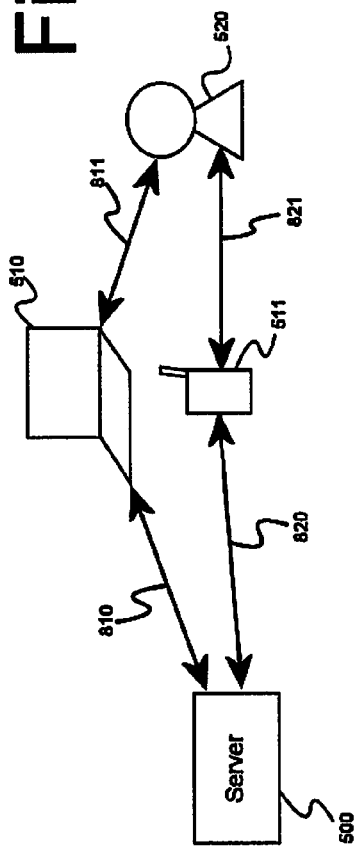
FIG. 8 (Prior Art) is a diagram illustrating the prior art technique of out-of-band authentication using a mobile device.
Figure 9:
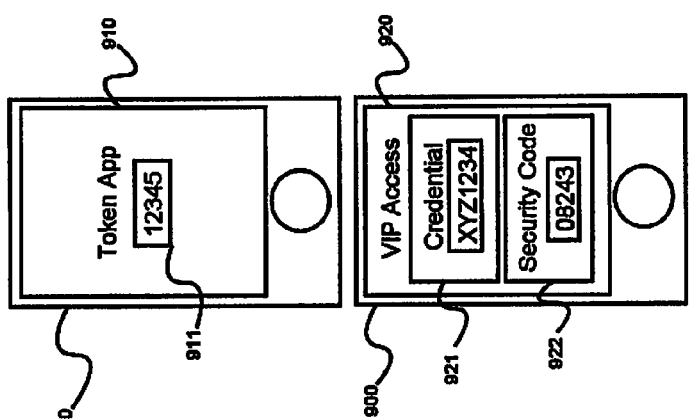
FIG. 9 (Prior Art) is a diagram illustrating the prior art technique of in-band mobile OTP authentication.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules can be variously implemented to run on server and/or client components.

Conceptual Architecture

Figure 10:
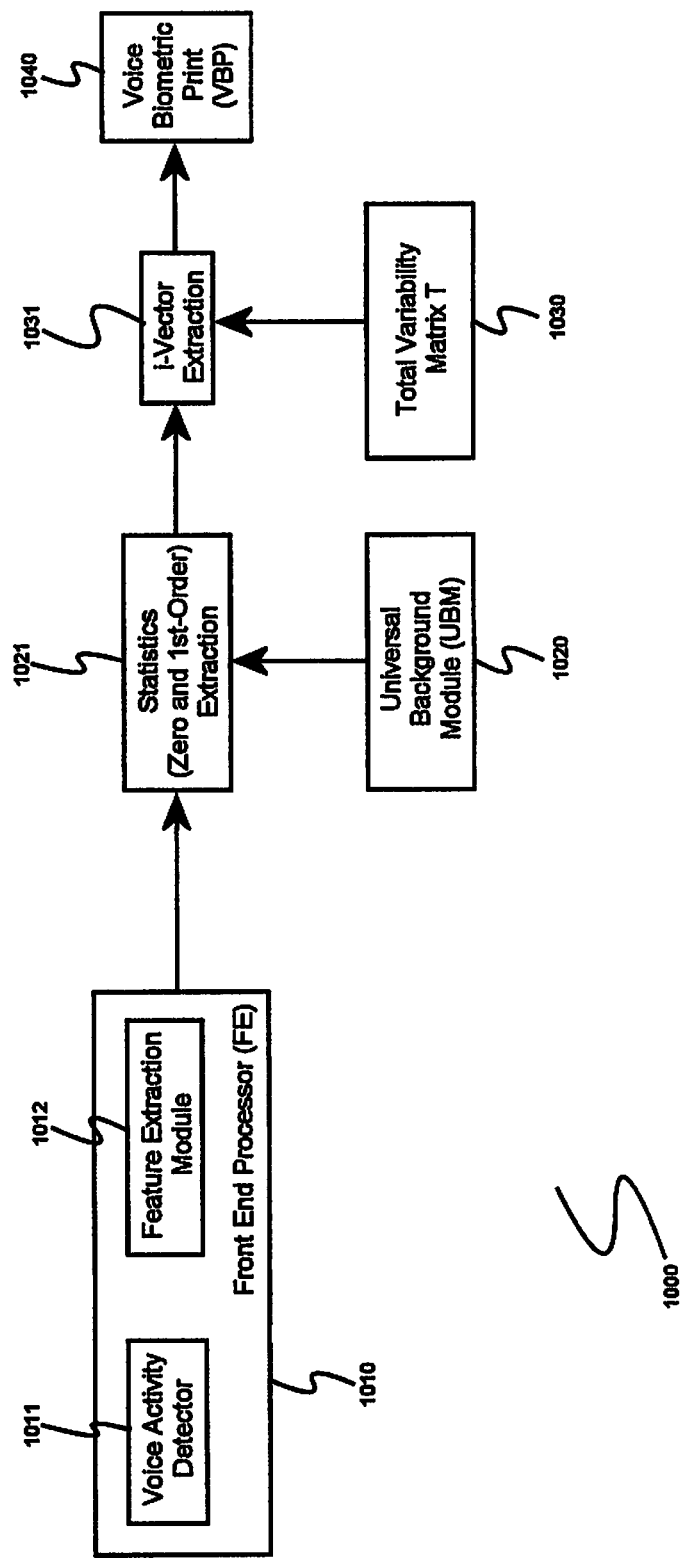
FIG. 10 is a system diagram showing components of a preferred embodiment of the invention.

FIG. 10 provides a high-level diagram of a speaker recognition system 1000, according to a preferred embodiment of the invention, which will be useful for discussing aspects of the invention and improvements inherent in the invention over systems known in the art. According to the embodiment, speaker recognition processes start in a front end processor 1010, which generally comprises a voice activity detector 1011 and a feature extraction module 1012. Voice activity detector 1011 may comprise an operating system component integrated with a microphone or other audio input device coupled to a processor, or it may comprise a specialized software application that is coupled to a standard audio input device through an associated device driver. Voice activity detector 1011 may be implemented so that it remains essentially idle except for a single process that "listens" for audio input that can be automatically classified as being associated with a human or human-like voice (it should be appreciated by one having ordinary skill in the art that "speaker recognition" can in fact recognize non-human speakers, if these speakers are characterized by statistically stationary voice biometric prints). In such embodiments, voice activity detector 1011 ignores all audio received from audio input devices until it detects the presence of a human voice, and then begins to collect digital audio and to pass it on to feature extraction module 1012. In other embodiments, voice activity detector 1011 is activated upon explicit request from a user or a third party application. For example, when a user of a mobile device tries to access an online banking application, the banking application may send an authentication request to speaker recognition system 1000, at which point voice activity detector 1011 would be directed to capture specific voice samples. In many embodiments, once a need for identification or authentication of a speaker has been identified, the speaker may be requested to speak certain test phrases, and voice activity detector 1011 would then capture the spoken phrases as digital audio and pass the digital audio data to feature extraction module 1012.

Feature extraction module 1012 receives an input stream of audio data, typically but not necessarily containing at least a signal corresponding to a voice to be identified or recognized. Many feature extraction techniques are well-known in the art of automated speech recognition and automated speaker recognition, any of which may be used according to the invention. In a preferred embodiment, feature extraction module 1012 breaks incoming audio streams into short (typically but not necessarily limited to 20 milliseconds in duration) packets and then analyzes each packet to produce a frame or feature vector, which extracts the relevant information for this purpose. In general, front end processor 1010 has the task of receiving raw audio from one or more audio input devices (or, it should be noted, from any source, such as a recorded audio data file or an audio data stream received over a network), and extracting a frame for each packet (or time slice) within the sampled audio, and then passing the extracted features for each utterance to one or more statistics extraction modules 1021. Each utterance is typically split using a window (for example, Hamming, Hanning, and so forth), generating the packets. The window is usually 20 ms length and 10 ms shift. Each packet is used to compute a feature vector, which is composed usually of 60 elements, although this value is highly variable.

Audio data received by front end processor 1010 can be in any format now known or developed in the future for digitally encoding audio data, for instance AAC (advanced audio encoding), HE-AAC (high efficiency AAC), G.722, various substandards of MPEG-4, WMA (Windows Media Audio), and so forth. It should be understood by one having ordinary skill in the art that any known or future audio encoding technique may be used as input to front end processor 1010, since voice activity detector 1011 can be configured to receive audio using any arbitrary data encoding standard.

Extracted features for each utterance are passed to statistics extraction module 1021, which is a software, firmware, or hardware module adapted to receive utterance feature sets and to compute a variety of statistics regarding them. In many speaker recognition systems known in the art, zero-order and first-order statistics are computed using both the extracted features of an utterance and a universal background model 1020 (UBM), which represents general, person-independent and phrase-independent feature characteristics, although it could be phrase-dependent if it is desirable to have a more ad hoc UBM. Specifics regarding statistical computations performed in statistical extraction module 1021 and regarding the use of UBM 1020 will be described in more detail below with reference to FIG. 11.

Statistics computed by statistics extraction module 1021 are in turn passed to iVector extraction module 1031, which also receives as input a total variability matrix T 1030, which is a matrix whose columns span a subspace where the most significant speaker and session variability is confined, and thus is used to characterize the degree to which a given speaker's voice is likely to vary from like utterance to like utterance within a session and over longer periods of time (if data is available for longer periods of time). The process of creating iVectors, and the nature of iVectors, will be described in more detail with reference to FIG. 11. Conceptually, the output of iVector extraction module 1031 is a voice biometric print (VBP) 1040 (also commonly called a "voiceprint"), which represents a mathematical model of a speaker's vocal tract and a particular channel (i.e., mobile phone, land line phone, microphone in noisy area, etc.), and is analogous to a user's fingerprint. The voice biometric print is of primary importance for this reason in speaker recognition systems 1000. Accordingly maintaining the security of VBPs is of paramount importance, particularly when mobile device usage is considered.

In general, accuracy of a voice biometric print 1040 can be affected significantly based on the channels involved. That is, if a voice biometric print 1040 was computed based on a series of speech utterances received at enrollment over a low-noise channel (for example, a high-quality microphone being used in a quiet room), then authenticating the same speaker when she is using a mobile phone from a remote area (a high noise channel) is much more likely to give inaccurate results than if a VBP 1040 made using the same enrollment conditions was used. Additionally, as mentioned before, one potential reason voice biometrics may be less user-trustworthy than other biometric approaches is that it is relatively easy to imitate a voice, particularly if one has access to a voice biometric print 1040 of the person whose voice is to be imitated (note, though, that the transformation from raw speech to iVector is not mathematically reversible; that is, it is not possible to generate a speech sample starting with an iVector—however, in a man-in-the-middle attack, a stolen iVector can be used to gain entry into a secure system by using the stolen iVector to make it appear as if a speaker has authenticated properly). This is generally not nearly so true of other biometric systems. But the ease of carrying out speaker recognition-based authentication of users of mobile devices is compelling, since no special hardware is needed (almost all mobile devices today have low-noise microphones and reasonable memory, processing power, and bandwidth). Accordingly, it is an important object of the present invention to make it possible for voice biometric authentication to be used on mobile devices, even when they are not connected to a network, to provide a means for adapting a voice recognition so that a user can be authenticated when using any of a plurality of devices associated with the person with high accuracy and potentially without having to have their voiceprint stored in a central server (where it is susceptible to compromise), and to make such speaker recognition-based authentication systems trustworthy by both users and merchants and easy and intuitive to use.

Figure 11:
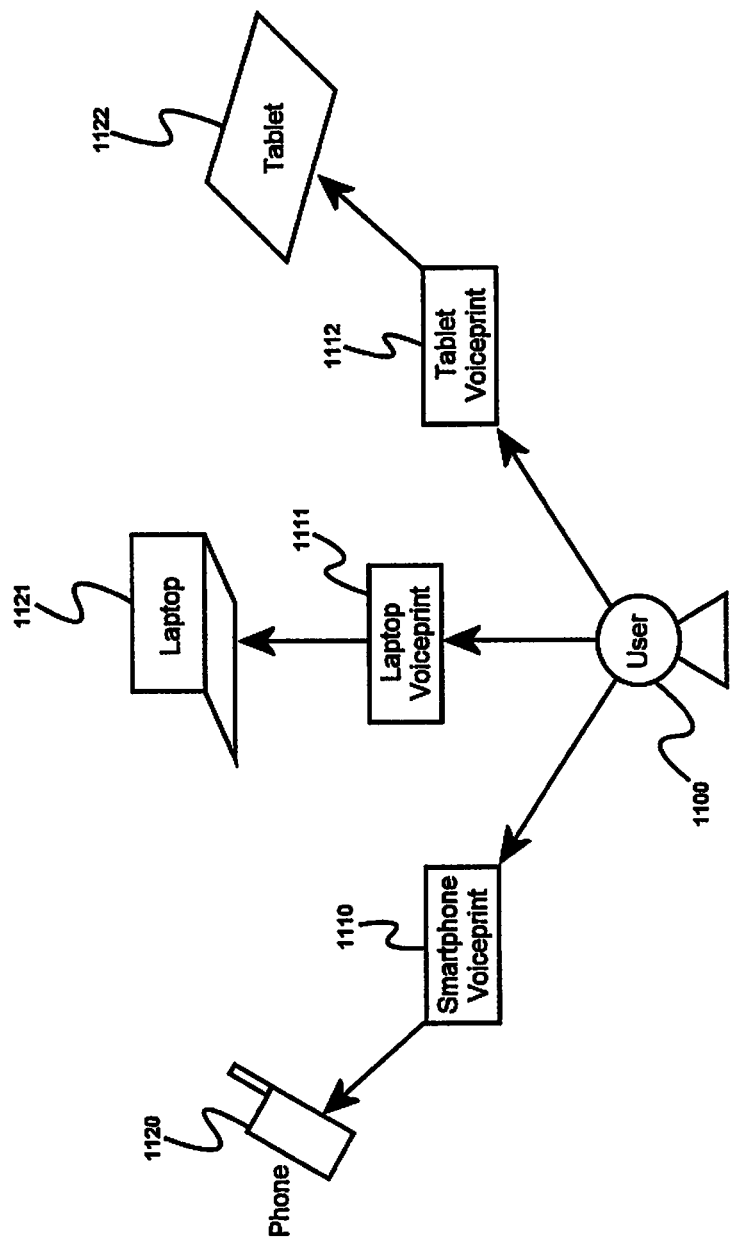
FIG. 11 is a diagram illustrating an embodiment of the invention in which one speaker is associated with a device-specific voice biometric print (VBP) for each of a plurality of mobile devices.

One way to reduce the problems inherent in performing voice biometrics on mobile devices (or in conjunction with the use of mobile devices) is to eliminate the inaccuracy that may occur during cross-channel authentication attempts (because of the problem cited above wherein the channel used during enrollment differs significantly in acoustic characteristics from the channel used during authentication) is to use a method that allows mobile device-based voice recognition, specifically by generating and using a different voice biometric print 1040 for each mobile device used by a given person. FIG. 11 shows a diagram of such an embodiment. According to the embodiment, a user 1100 uses a mobile phone 1120 such as a smart phone, a laptop 1121, and a tablet computer 1122. Such users are more and more common as widespread market adoption of tablet processors such as the iPad™ and its competitors, "extremely smart" phones based on Apple's iOS™ or Google's Android™ operating systems occurs without people abandoning their laptops and desktop computers. According to the embodiment, a smart phone voiceprint 1110 is generated using enrollment via smart phone 1120, a laptop voiceprint 1111 is generated using laptop 1121, and a tablet voiceprint 1112 is generated using tablet 1122. In this way, the same user can be authenticated with high accuracy regardless of which mobile device is in use. Normally, such an approach would be considered impractical because people generally do not want to enroll multiple times, given that their identity doesn't change; user attitudes have been assumed to be something equivalent to, "there is only one of me, so you can do this annoying enrollment process once, and it's up to you to make it work everywhere". As will be seen below with reference to FIGS. 18 and 19, among others, embodiments of the instant invention present novel solutions to this user acceptance problem. In short, users are encouraged to become actively engaged in controlling their security, in such a way that multiple enrollments will not be seen as an annoyance but rather a way of doing business securely and easily in our highly mobile and highly connected world. Note that in various embodiments of the invention, it is assumed that channel mismatch may produce score distribution shift. Because of that, in some embodiments various score normalization techniques based on target scores may be used, particularly because there will be many more target scores than of non-target scores. It will be appreciated by one having ordinary skill in the art that other approaches could be considered, such as model or iVector adaptation, which may be included in various embodiments of the invention.

In line with the above objectives of achieving both reliable authentication and enhanced usability of voice biometric systems, it is often important to avoid disturbing or disrupting users during their normal use of mobile devices (since disrupting users' normal activities is intrinsically not user-friendly). One way to achieve this is to have users only provide short utterances during enrollment and/or testing. Those having ordinary skill in the art will appreciate, though, that when users are provided only short utterances, accuracy is often sacrificed unless the text to be used is fixed (i.e., in text-dependent voice biometrics, this is not such a major issue). However, text-dependent speaker recognition systems are usually based, like automated speech recognition (ASR) systems used for voice dialog systems, on an underlying hidden Markov model (HMM) pattern recognition paradigm. HMMs do not generally provide good solutions in scenarios where flexibility is desired, which will normally be the case in speaker recognition systems using mobile devices. An alternative to using text-dependent speaker recognition that also avoids use of HMMs is to focus on utterances instead of a complete text. An utterance-dependent solution will depend on some finite set of known utterances, while an utterance-independent solution will generally be useful regardless of what utterances are used. Since utterances are by definition much smaller than full text passages, it will often be possible to use utterance-independent authentication without having to use HMMs (rather, GMMs can be used as normally is done in speaker recognition solutions). It is a goal of the invention that both utterance-dependent and utterance-independent solutions will work in the various embodiments described in detail below.

DETAILED DESCRIPTION OF EXEMPLARY EMBODIMENTS

One of the primary objectives that should be met, if possible, to achieve robust mobile device-capable speaker recognition system 1000 capabilities is to provide systems and methods which enable most or all of speaker recognition enrollment and testing to take place entirely on a mobile device. This requires considerable enhancements over the speaker recognition systems known in the art, since speaker recognition systems typically depend on readily available server processor capacity, memory, and bandwidth. Even with the dramatic improvements in the processing capabilities of modern smart phones and tablet computers, it is generally not possible to carry out conventional speaker recognition enrollment and testing entirely on a mobile device. Accordingly, the inventors have conceived several improvements over the art that make it possible to reduce the demands made on mobile device resources by speaker recognition systems according to the invention.

Figure 12:
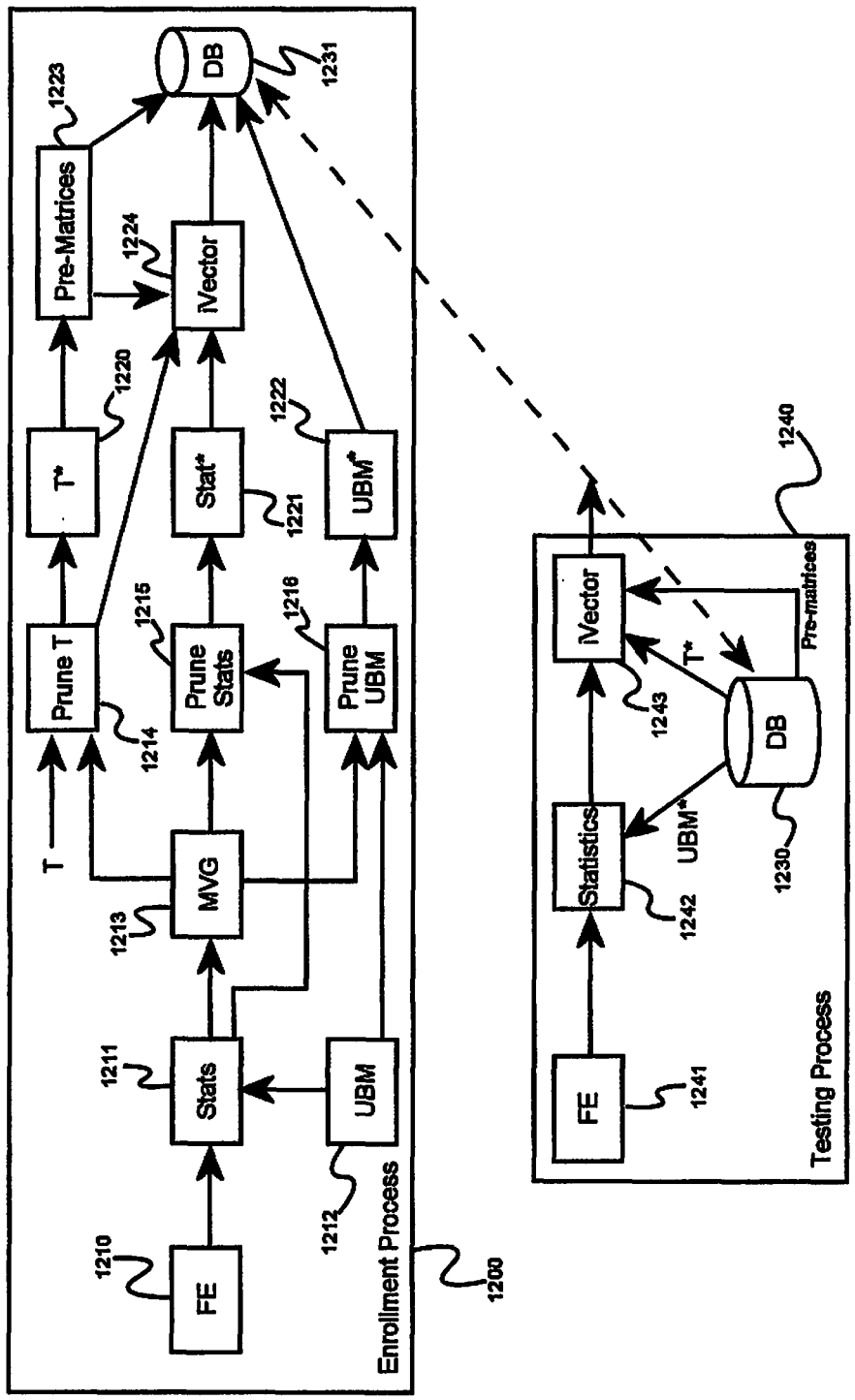
FIG. 12 is a detailed diagram showing relationships between enrollment and testing processes, according to an embodiment of the invention.

To illustrate these improvements, it will be helpful first to consider the enrollment 1200 and testing 1240 processes illustrated in FIG. 12 in more detail. In general, speaker recognition technologies in the art are based on techniques that leverage total variability between audio signals derived from speech samples or sets of utterances obtained from and representing a population of speakers. For each sample, a key step is to extract a voice biometric print 1040 that accurately represents, mathematically, the total variability associated to speaker and channel information. Such voice biometric prints 1040, when they are obtained during an enrollment process 1200, can be readily used in a testing process 1240 by comparing a voice biometric print 1040 obtained during testing to that obtained during enrollment; for a successful recognition or authentication, there should be only very minor differences between the two voice biometric prints 1040.

In general, speaker recognition technologies known in the art are based on techniques that take advantage of a total variability paradigm. Each speaker can be associated with a voice biometric print 1040 that represents mathematically how that speaker's voice deviates from a universal background model (UBM) 1212, the comparisons being made on an utterance-by-utterance basis. In more detail, in an embodiment of the invention, given an utterance X received by feature extraction module 1210 (also referred to, as in FIG. 12, as "FE"), FE extracts a feature set $X=\{x_t\}$, and statistics extraction module 1211 ("stats") computes statistics for the utterance based on each component of a universal background model 1212 according to an equation substantially equivalent to:

$$N_c(X) = \Sigma_t p(c|x_t) \text{ and}$$

$$\tilde{F}_c(X) = \Sigma_t p(c|x_t)(x_t - m_c),$$

where $p(c|x_t)$ is the posterior probability of component c given a corresponding frame $x_t$. Also, $m_c$ is the mean of the c component of UBM 1212. It is well-known in the art to proceed directly from statistics extraction to iVector generation 1224, with iVector w being computed by:

$$w = (I + T'\Sigma^{-1}N(X)T)^{-1}T'\Sigma^{-1}\tilde{F}(X),$$

where T is a total variability matrix of dimension (CF×D) (where C is the number of components c, F is the dimension of the feature vectors, and D is the dimension of iVector w), whose columns span a subspace where most speaker and session variability is confined, $\Sigma$ is a block diagonal covariance matrix of dimension (CF×CF) whose diagonal blocks are Nc(X)I, and $\tilde{F}(X)$ is a supervector of dimension (CF×1) obtained by concatenating all first-order Baum-Welch statistics $\tilde{F}_c(X)$.

Since both $\Sigma$ and N(X) are block diagonal matrices whose blocks are related to the different Gaussians in UBM 1212, the term $(I+T'\Sigma^{-1}N(X)T)^{-1}$ can be expressed as follows:

$$(I + T'\Sigma^{-1}N(X)T)^{-1} = (I + \Sigma_{c=1}^{C} N_c(X)T_c'\Sigma_c^{-1}T_c).$$

Therefore, the previous term can be computed by accumulating the C matrices $T_c' \Sigma_c^{-1} T_c$ (c=1, ..., C) previously scaled with $N_c(X)$. These matrices are square matrices with a dimension equal to that of iVector w, that is (D×D), and they are utterance-independent, so according to an embodiment of the invention they are pre-computed to save computational costs at runtime, resulting in storage of C matrices of dimension ((D+1)×(D+1)). For example, in an exemplary embodiment of the invention there may be 256 Gaussians and 400 dimensions for iVectors w, storage of C pre-computed matrices would require 157 MB of memory (256×401×401 floating point numbers), which is generally far too high a memory level for mobile device applications. Moreover, even in high-performing mobile devices, moving such a large volume of pre-computed data from persistent storage into random access memory (RAM) will generally be too time-intensive, making the approach just described generally unsuitable for use on mobile devices.

But in fact the pre-computed matrices are weighted by zero-order statistics, specifically by the factor $N_c(X)$, and it is possible to leverage this fact to reduce the resource requirements needed to use the method just described of storing pre-computed matrices. Given a specific recognition environment, most components of UBM 1212 are not activated by a given utterance, so that only a few components could be considered in order to compute accumulated value $\Sigma_{c=1}^{C} N_c(X) T_c' \Sigma_c^{-1} T_c$. Accordingly, it is only necessary to move from persistent storage to RAM only a most-important set of pre-computed matrices, and we can ignore those that correspond to lower values of $N_c(X)$. Moreover, in some embodiments matrices $T_c' \Sigma_c^{-1} T_c$ are computed during each testing process 1240 when there is insufficient persistent storage to hold all pre-computed matrices on a mobile device, or when it is faster to compute the matrices than to load them. In general, the inventors have conceived of several techniques that may be used to manage resource consumption during speaker authentication on mobile devices, including in particular (but not limited to) pruning Gaussians used to compute statistics in statistics extraction module 1211, with only the most important Gaussians (referred to as "most valuable Gaussians" or MVGs) being retained. Moreover, the inventors have experimentally verified that one can carry out pruning of Gaussians, as described in more detail below, without meaningful accuracy degradation, thus enabling speaker recognition on mobile devices.

In order to reduce resources required for storage and transferring of pre-computed matrices, it is necessary to understand how many components of the universal background model 1212 are activated by each utterance. If only a few components are activated, there will be a correspondingly large reduction in resource usage, both memory for storage of the reduced number of Gaussians, and bandwidth or disk read time for transferring necessary pre-computed matrices from persistent storage. Generally, the number of Gaussians required in a given situation will depend on two key factors: the sounds produced during an utterance (which in turn is determined by the language and text used), and the speaker to be recognized (since some people have more variation in their vocal characteristics, which corresponds to activating more Gaussians of the UBM 1212). Generally, as will be recognized by one having ordinary skill in the art, the more phonemic variation there is in a spoken phrase used in speaker recognition, the more Gaussians will be required to recognize the speaker using the phrase with sufficient accuracy.

According to a preferred embodiment of the invention, during enrollment phase 1200, a number of Gaussians to be used is determined by ordering all of the Gaussians for a given utterance in order of their values of $N_c(X)$ and then computing or estimating a cumulative probability while working down the list (adding successive weighting factors $\square_\square(\square)$ and dividing the sum by the total of all weighting factors, although if weighting factors are normalized so that the sum totals to one, then one may simply add the weighting factors. Based on experiments conducted by the inventors, a cumulative probability of 80% (that is, selecting enough Gaussians so that they account for at least 80% of the total of all Gaussians based on their weighting factors) will generally provide sufficient data to provide accurate recognition results.

In order to estimate a set of most valuable Gaussians (MVG) 1213, during enrollment phase 1200 a set of zero-order statistics (Nc) is computed for each utterance by statistics extraction module 1212. The statistics are normalized so that $\Sigma_c N_c = 1$ and sorted in sequence from higher to lower values of $N_c(X)$, then for each component a cumulative probability is determined; that is, the probability that a random component is a member of the set of all of the earlier components plus the one for which a cumulative probability is being computed. When cumulative probability reaches some threshold level such as 80%, all components up to that point are added to MVG 1213 and remaining Gaussians are discarded. In general, in free speech recognition scenarios there will be more MVGs, and it may be desirable in some embodiments to further augment a set of MVGs in order to ensure that MVGs are properly modeled (i.e., to ensure that all possible sounds coming from speaker being recognized are properly represented using MVG 1213). For example, in enrollment, one might select a MVG with all associated audios required to generate the model. For that, zero-order stats are used. Then, using MVG 1213, UBM and T matrix are pruned. Also, the number of pre-computed matrices to generate the iVectors is reduced. In other words, selecting MVG implies pruning UBM and T and reducing the number of pre-computed matrices to compute the iVectors. In testing, the MVG selected during enrollment is used, which is equivalent to using pruned UBM, T and pre-computed matrices.

A further approach to reducing resource consumption during speaker recognition, according to an embodiment of the invention, is to prune both universal background model (UBM) matrices and total variability (T) matrices, and then only using the pruned matrices, which further reduces the amount of pre-computed data which must be stored in persistent memory and then transferred to memory during recognition. Of course, when matrices are pruned there will generally also be a substantial reduction in processor load, since computational costs of matrix computations are well understood in the art to be highly dependent on matrix rank (which is lower when low-order values are pruned). In general, if the number of components used in UBM matrix 1213 is N, the reduction in resource consumption will be 1−N/C.

Referring again to FIG. 12, during enrollment a full universal background model 1212 is used to extract statistics in statistics extraction module 1211, and these statistics are then reduced to generate a set of most valuable Gaussians 1213. This set is then used with a total variability matrix T to prune T in step 1214 to obtain a pruned total variability matrix T* 1220. Similarly, statistics can be pruned using MVG 1213 in step 1215 to obtain pruned statistics Stat* 1221, and full universal background model 1212 can be used with MVG 1213 to prune the UBM to obtain pruned UBM* 1222, which is then stored in database 1231. Then, the pruned T* matrix 1220 is used to obtain pre-computed matrices 1223 in database 1231. Finally, pruned Stat* are used with pruned T* and pre-computed matrices 1223 to compute iVector w 1224, which is also stored in database 1231. Thus after enrollment all required elements are in place for speaker recognition. Specifically, when during testing process 1240 a set of utterances is obtained from a speaker to be recognized or authenticated, feature extraction 1241 is performed in the same way as it was in enrollment. But, when computing statistics 1242, pruned universal background model UBM* is used (thus achieving a reduction in resource usage during recognition), and pruned total variability matrix T* and pre-computed matrices are used with the resulting statistics 1242 to generate iVector w 1243. Note that database 1230 may be the same database 1231 as used in enrollment, or separate databases could be used, without departing from the scope of the invention.

Figure 13:
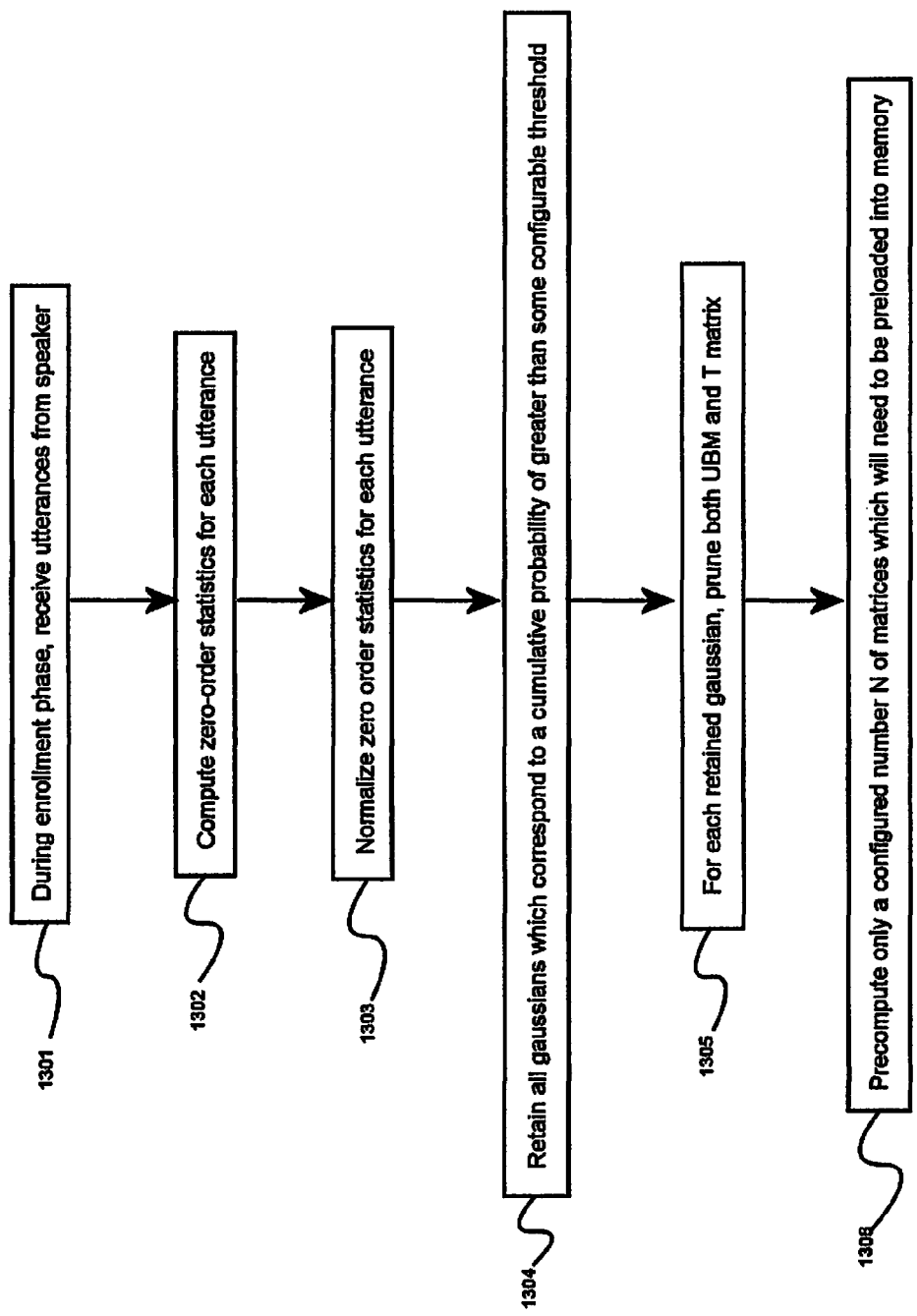
FIG. 13 is a process flow diagram of a method for reducing a quantity of most-valuable Gaussians, according to an embodiment of the invention.

FIG. 13 is a process flow diagram of a method for reducing a quantity of most-valuable Gaussians, according to an embodiment of the invention, most details of which were discussed above with reference to FIG. 12. In step 1301, during an enrollment phase 1200, utterances are received from a speaker who may later need to be recognized or authenticated. Then, in step 1302 zero order statistics ($N_c(X)$) are calculated for each utterance, and in step 1303 the zero order statistics are normalized so that the sum of all normalized Nc for each utterance is equal to one. Then, in step 1304, all Gaussians which correspond to a cumulative probability greater than some configurable threshold are retained, and in step 1305, for each retained Gaussian, pruned UBM and T matrix are computed. Finally, in step 1306, a configured maximum number N of matrices (UBM* and T*) are pre-computed and stored in database 1231, from whence they can be preloaded into memory when a speaker recognition test process 1240 is begun.

Figure 14:
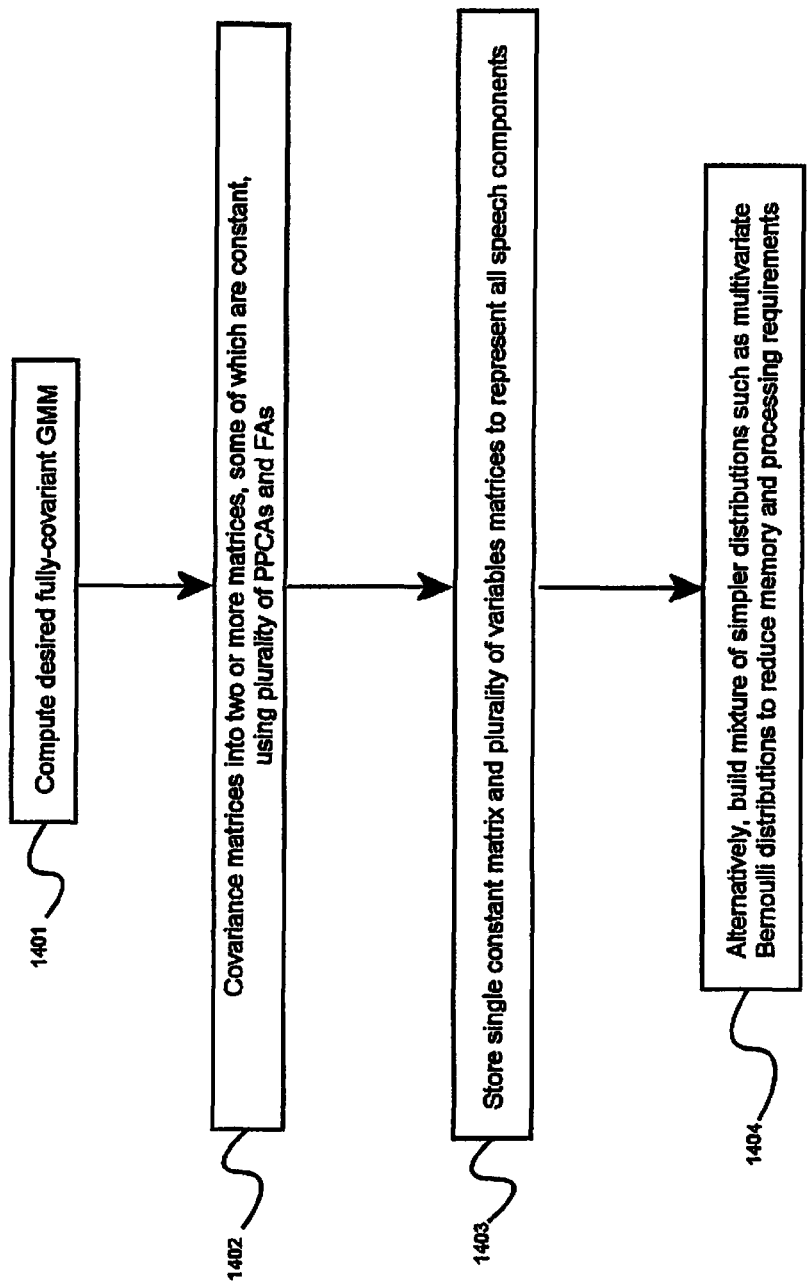
FIG. 14 is a process flow diagram of a method for reducing a quantity of free parameters associated with a fully-covariant Gaussian, according to an embodiment of the invention.

Another approach, according to an embodiment of the invention, for reducing resource usage needed for speaker recognition on mobile devices, is described in the process flow diagram of FIG. 14. In general, a universal background model UBM, which is an essential part of a speaker identification system, is usually a GMM (mixture of Gaussians). The Gaussian distributions can be full-covariance, diagonal covariance or any other intermediate solution. When it is full-covariance, many free parameters have to be estimated and stored, which could be a problem in some circumstances. Several options may be pursued, according to various embodiments, to reduce the number of free parameters of the covariance matrices. Doing so is beneficial for storage, but also for estimation, because less data will generally be required. According to the embodiment, the number of free parameters of a full-covariance Gaussian mixture model (GMM) is reduced without materially decreasing the accuracy of speaker recognition. To do this, in step 1401 a fully covariant GMM matrix is computed in a normal way (although reduction of free parameters could be accomplished at the same time a GMM is computed, rather than a separate step after it is computed). Then, in step 1402, each fully covariant GMM is decomposed into two or more matrices, at least one of which is constant for all components and at least one of which varies from component to component. Decomposition can be carried out using any of a number of means for matrix decomposition known in the art, including but not limited to using a mixture of probabilistic principal component analyzers (PPCAs), using a mixture of factor analyzers (FAs), and the like. Typically, the variable matrices for each component will be reduced (of lower rank) relative to the original fully covariant GMM matrix from which it was obtained in step 1402. In step 1403, the single constant matrix and a plurality of reduced matrices (one per Gaussian) are stored, which results in a significant savings in data storage and in processing relative to storing a fully covariant GMM for each component. In general, if the number of components is high and an efficient decomposition is carried out, the inventors have determined that recognition accuracy can be maintained virtually unchanged with only a few free components. Another approach would be to, in step 1404, build a mixture of simpler distributions to capture the richness of a given set of speaker data (i.e., a given set of utterances' speech components). For example, while binary Bernoulli distributions have been used effectively for some time in image processing applications, they can be extended to multinomial cases and then used to model speech data. Using multivariate Bernoulli mixtures can in general lead to improved accuracy even while reducing data storage and processor resource requirements.

Figure 15:
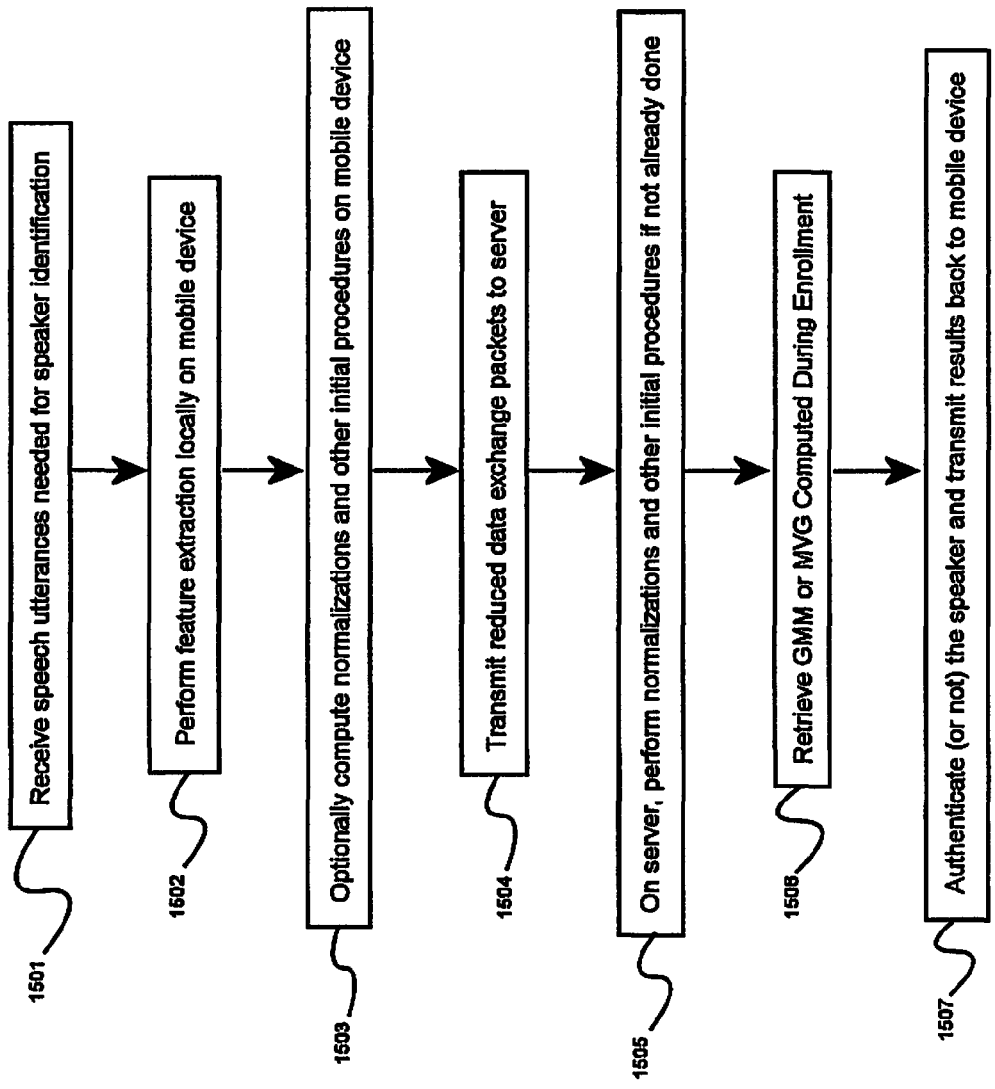
FIG. 15 is a process flow diagram of a method for reducing bandwidth required for server-based speaker authentication of a user of a mobile device, according to an embodiment of the invention.

The techniques just discussed focus on reducing dimensionality of problems in speaker recognition, with a primary goal being to reduce either the amount of data required to be pre-computed or stored on a mobile device, or to reduce the computational load of speaker recognition on mobile devices (both of which are generally ways to accomplish more robust speaker recognition on less-capable mobile devices). Other embodiments utilize additional techniques to improve performance, usability, or security of mobile device-based speaker recognition. One of these embodiments is illustrated in FIG. 15, which is a process flow diagram of a method for reducing bandwidth required for server-based speaker authentication of a user of a mobile device. In the art, it is common to perform speaker recognition entirely on servers, with mobile devices acting only as speech input devices and then as recipients of successful (or unsuccessful) recognition results. This approach, as mentioned above, has at several significant drawbacks. First, excessive bandwidth required to transfer speech samples in their entirety from a mobile device to a server-based speaker recognition engine can be excessive, particularly when mobile bandwidth availability is low, or prices are high. Additionally, server-side speaker recognition scenarios that require transference of complete speech samples from a mobile device to a server are prone to man-in-the-middle attacks, which can allow speech samples to be recorded and used later for successful penetrations of systems that can be accessed by the speaker whose voice has been "stolen". Accordingly, it is beneficial, according to the invention, to perform as much of the work in speaker recognition directly on a mobile device, and to send only small, encrypted data packets to a server where any remaining steps may be carried out. Many possibilities exist, based on for example the relative importance of conserving bandwidth, having a light client (low resource usage) on a mobile client, and avoiding exposure of raw speech samples to interception.

In one embodiment of the invention, after speech audio is captured on a mobile device in step 1501, feature extraction 1210 is performed directly on a mobile device in step 1502. In step 1503, optionally normalizations and other initial procedures may be performed on the mobile device, and the encrypted feature vectors are then transmitted to a server for further processing in step 1504. Feature extraction 1210 is particularly suitable for execution on mobile devices, since feature extraction libraries are typically small (for example, less than 12 MB) and require only modest memory resources (for example, in one implementation known to the inventor, about 8 MB), and since feature vectors require much less bandwidth when transferred to a server, relative to transferring complete speech samples. While in various embodiments some, most, or all normalizations, delta, and delta-delta features may be computed along with static feature coefficients on a mobile device, depending on bandwidth versus processing speed tradeoffs. In general, computing feature extraction 1210 takes from 0.5 to 1.75 seconds for a three-second speech sample when conducted on a mobile device according to an embodiment of the invention, which is generally a reasonable time frame for realistic use cases. Once feature vectors are received on a server, in step 1505 any normalization and initial procedures not carried out on the mobile device before sending are carried out on the server, and then in step 1506 the server retrieves Gaussian mixture models and/or a set of most valuable Gaussians, which were generated during enrollment (these need only be computed once, during enrollment, and then used as required). Finally, in step 1507, iVectors are computed and the speaker being tested (i.e., normally the user of the mobile device form which the speech sample was taken, although there are embodiments where this is not the case, such as where one person records another using a mobile device and then attempts to identify the person recorded using the invention) is either authenticated/recognized or not. In the first case, a message indicating authentication/recognition success is transmitted to the mobile device; in the second case, a message indicating a failed authentication/recognition is sent to the mobile device. In some embodiments, feature vectors may be compressed using one of the many audio codecs known in the art to further reduce bandwidth requirements.

Figure 16:
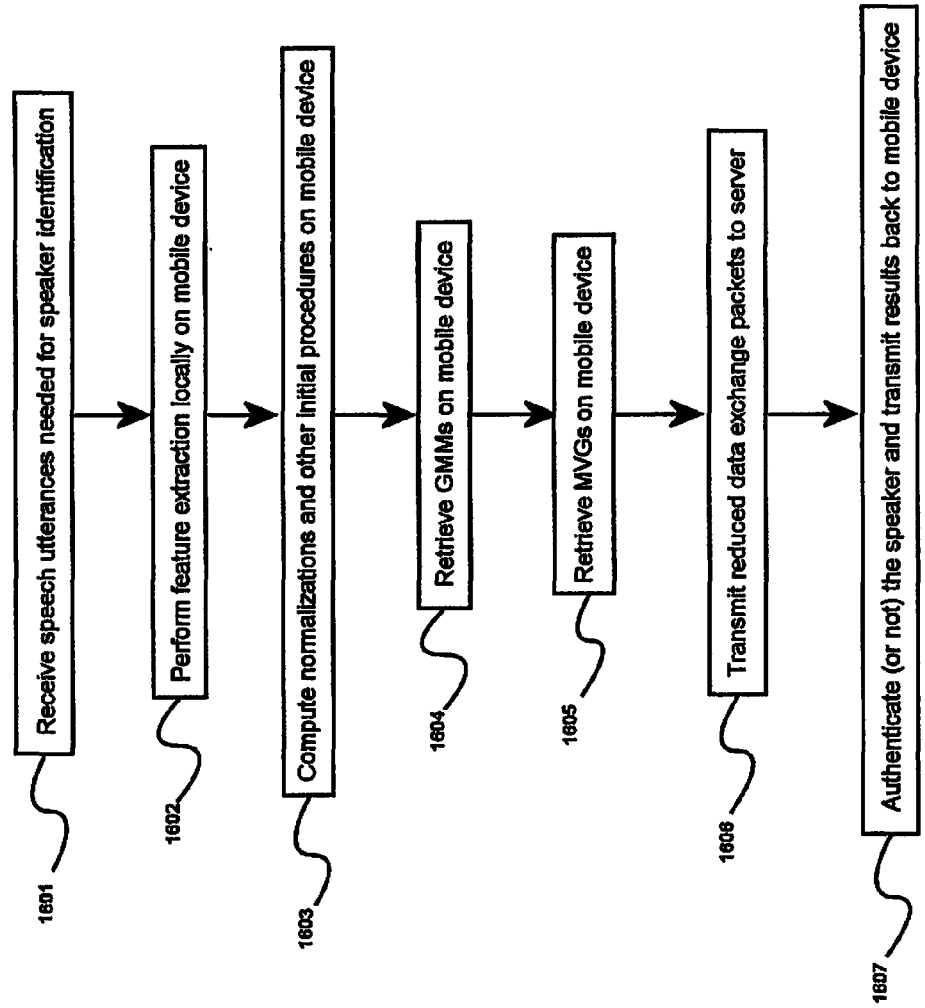
FIG. 16 is a process flow diagram of a method for reducing bandwidth required for server-based speaker authentication of a user of a mobile device, according to an embodiment of the invention.

In another embodiment, and referring to FIG. 16, in addition to feature extraction 1210, statistics extraction 1211 and most valuable Gaussian (MVG) determinations 1213 are also carried out on a mobile device. Specifically, in step 1601, a speech sample is received on a mobile device in order to allow the speaker to be identified or authenticated. Then, in step 1602, feature extraction 1210 is carried out on the mobile device, and in step 1603 the mobile device carries out normalizations and other initialization routines, and in step 1604 the mobile device retrieves GMMs, and in step 1605, the mobile device retrieves a set of most valuable Gaussians, so that in step 1606 the mobile device can transmit reduced data exchange packets to a server. Finally, in step 1607 the server authenticates (or not) the speaker being tested and transmits results back to the mobile device. The inventors have found that, in general, good results may be obtained if 50 MVGs are obtained on a mobile device during enrollment and passed to a server either in advance, such as during enrollment, or as required during authentication transactions. In such cases, the amount of data that is typically transmitted from a mobile device to a server is roughly 12 KB. Again, in some embodiments codecs may be used in order to reduce the bandwidth consumed, although since the amount of data to be transmitted is already relatively modest (and independent of audio length), this is not always necessary. In addition to what is required for feature extraction 1210, statistics extraction 1211 and MVG computation 1213 typically require less than 1 MB of stored data, less than 4 MB of memory, and less than half a second of incremental processing time on a mobile device, making this approach quite useful.

In yet another embodiment of the invention, in a voice biometric print 1040 is computed directly on a mobile device after feature extraction 1210, statistics extraction 1211, and MVG computation 1213. In such embodiments, only a voice biometric print 1040, of the form of an iVector 1224, needs to be transmitted to a server to be compared to a stored iVector from an enrollment phase. Typically, transmitting an iVector 1224 to a server requires just over 1 kilobyte of bandwidth, which in all modern situations is a trivial amount and is essentially resource-free. This ultra-low bandwidth comes at a cost of more processing on the mobile device, and typically an additional 21 MB of storage and 9 MB of memory is required, as well as an additional 2 seconds of processing time for a typical smart phone mobile device.

In embodiments where a mobile device carries out some or all of the preparatory work for speaker recognition, but final testing is performed on a server, it is important to ensure that the server isn't tricked into authenticating an impostor. Accordingly, in some embodiments certain steps may be carried out on the server to ensure that only authorized mobile devices and users are making requests to the server. One such security step that may be used is for the server to check whether statistics it receives come from an appropriate mobile device. In such cases, a device ID (such as are well-known in the art) may be included in a data exchange packet sent to a speaker recognition server in addition to such data as feature vectors, MVGs, or voice biometric prints. Since in most situations a user being authenticated will be using a mobile device that is associated with that user (for instance, her mobile phone or tablet computing device), checking a received device ID to ensure it corresponds to a device known to be associated with the user who is attempting to authenticate herself adds an element of security to the process. Similarly, in some embodiments a speaker recognition server may check to see whether a set of received statistics is exactly the same as some previously received set. If this is the case, it would present a strong likelihood that an impostor is attempting to deceive the speaker recognition server, for instance by attempting to use a recording of the speaker to be authenticated to gain unauthorized access to a sensitive system (this type of situation might arise, for example, as a result of a man-in-the-middle attack, where an attacker would be able to record a legitimate authentication utterance and then to attempt to reuse it for the attacker's own purposes).

Figure 17:
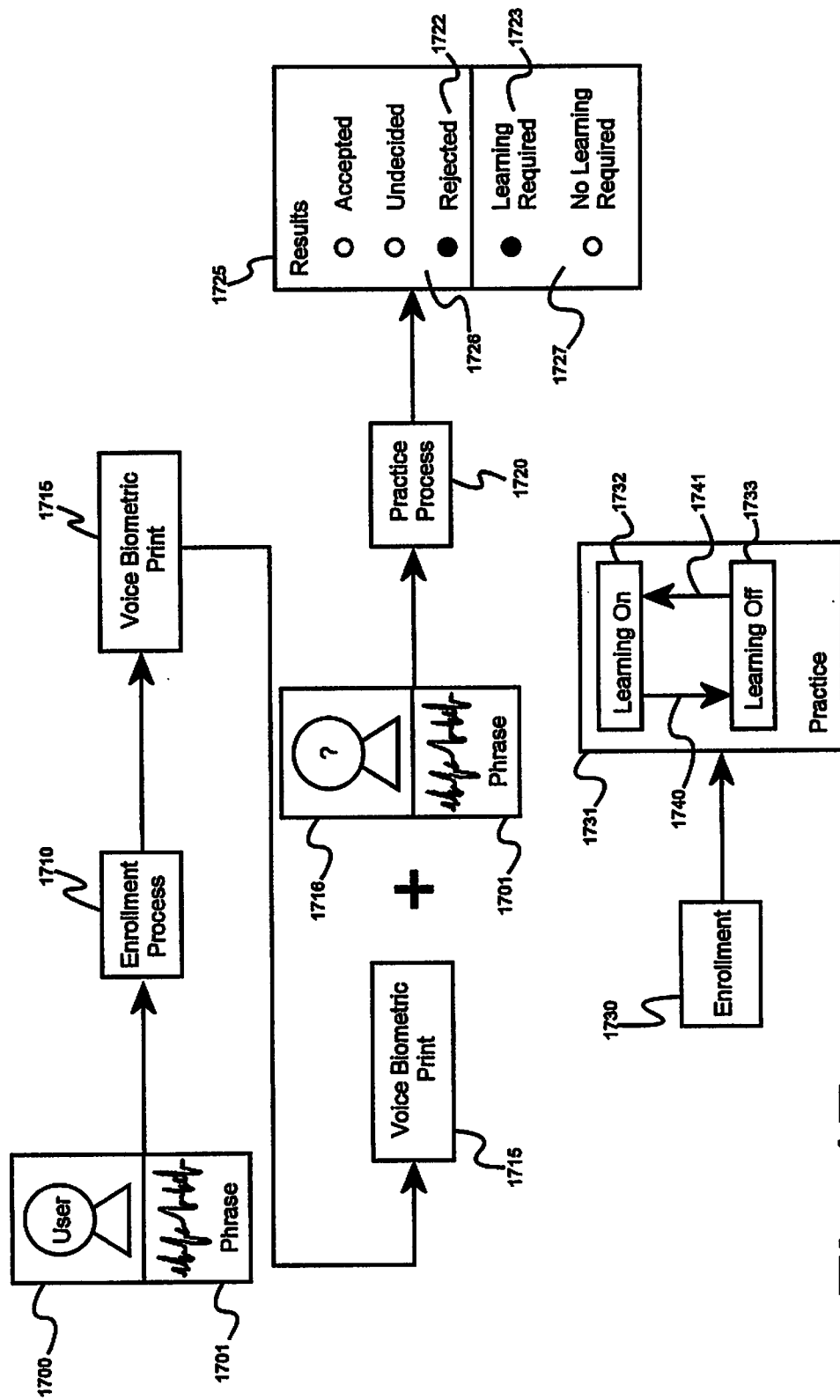
FIG. 17 is a high-level overview showing relationships between enrollment and practice processes, according to an embodiment of the invention.

In some embodiments, all functions of speaker recognition are carried out directly on a mobile device. In mobile scenarios it is important to be able to generate and maintain user trust in authentication systems, as only with such trust will users of mobile devices feel free to use them to full advantage, such as for performing commercial transactions and discussing sensitive topics in writing. One way to do this is to allow a user to create her own voice biometric print, to positively control it, and to continually improve it with successive practice at various times and in various embodiments. Such an approach would greatly increase the user's confidence in speaker recognition, since the user would effectively be a major stakeholder in the process. Conceptually, and referring to FIG. 17, user 1700 uses one or more phrases 1701 in a enrollment process 1710 to generate a voice biometric print 1715. This VBP 1715 is then improved through the use of additional phrases 1701 provided by an unknown voice 1716 in a practice process 1720, generating results 1725. Depending on practice scenario, results 1726 may be one of accepted (where the speaker recognition system believes that unknown speaker 1716 is in fact user 1700), rejected (where the speaker recognition system believes that unknown speaker 1716 is not user 1700), or undecided (where the speaker recognition system could not decide whether unknown voice 1716 corresponded to actual user 1700 or not). In some embodiments, an indication 1727 may be provided as to whether the system determines that more learning is required 1723 because speaker recognition performance is not sufficiently accurate, or not. According to the embodiments shown in FIG. 17, a first step is to train the system on the voice of user 1700 in enrollment process 1710. Following that, user 1700 will be able to practice, which allows user 1700 to test the system to see if it recognizes user 1700 (and, if appropriate, to determine that more training is needed before accepting a voice biometric print). Once user 1700 has created a good voice biometric print 1715, she can start practicing with the system to satisfy herself that the system works well enough to satisfy her (i.e., to gain her trust). Practicing, which will be described in more detail below with reference to FIG. 19, allows a user to test the system with true and impostor voice samples. A key aspect if building user trust is that the user herself decides, based on results 1725, whether the system was right or not, and so the user 1700 is effectively engaged in quality assurance of the voice biometric print that represents the user 1700. The relationship between enrollment 1730 and practice 1740 is that enrollment is used—always with user's 1700 voice—to build a candidate voice biometric print, while practice 1740 presents the speaker recognition system with a variety of true and impostor samples purporting to be samples of user's 1700 voice, and in practice 1740 the system can move 1740 from "learning on" state 1732 to "learning off" state 1733, and the system can move 1741 back to a "learning on" state 1732, as needed. During "learning on" 1732, voice biometric print 1715 may be modified, and practice with learning on is a means to refine voice biometric print 1715, whereas during "learning off" 1733, voice biometric print 1715 is never modified, but rather user 1700 can test the system to see if it is accurate or not (including for example trying to fool the system by distorting her own voice).

Figure 18:
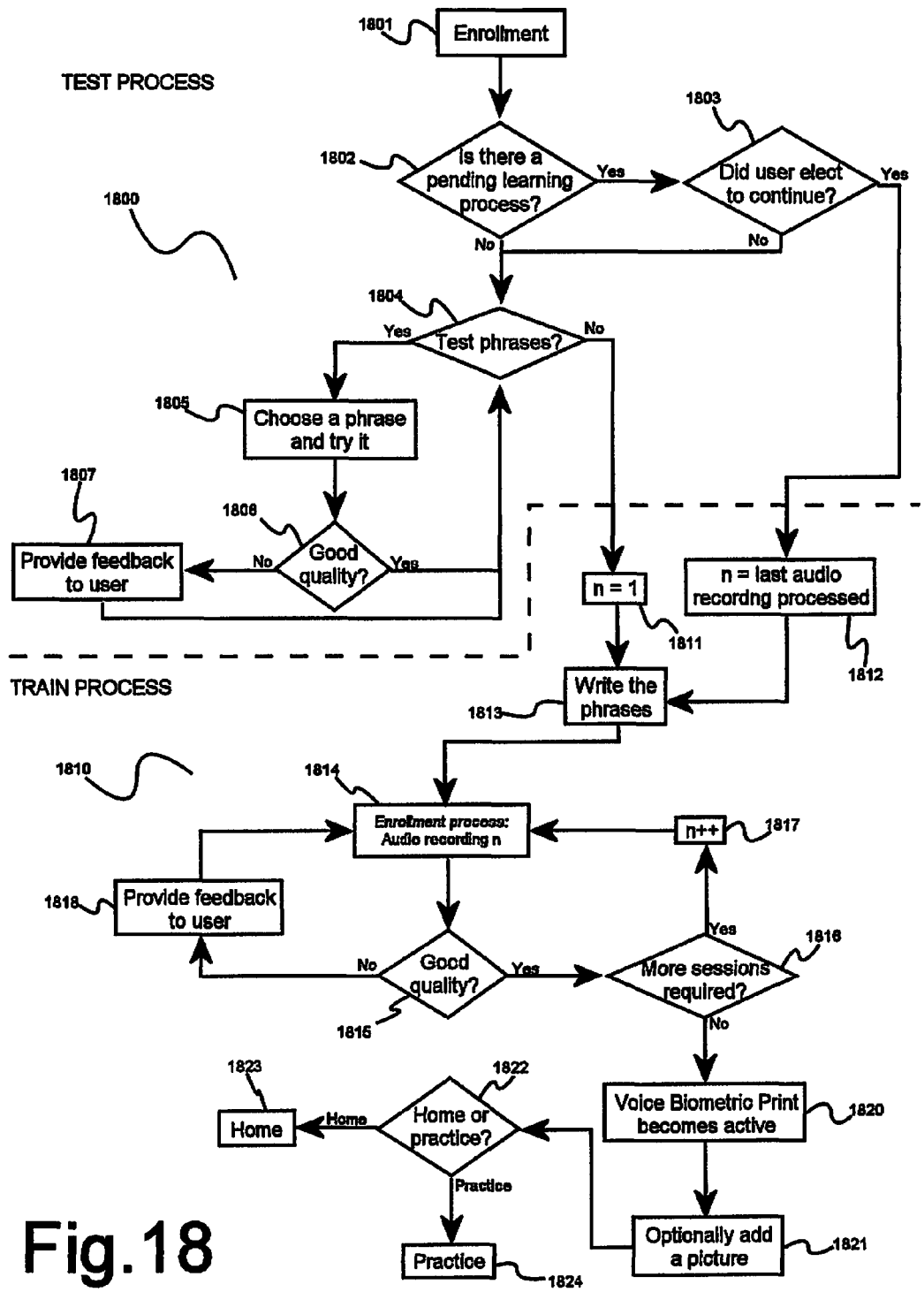
FIG. 18 is a process flow diagram of a enrollment method, according to a preferred embodiment of the invention.

FIG. 18 is a process flow diagram illustrating enrollment method 1800 in more detail, according to a preferred embodiment of the invention. Some general aspects of the enrollment process illustrated in FIG. 18 include the important ability for users to try out different test phrases (phrases which a user 1700 might be required to speak to be authenticated), to make sure both that the phrase is a suitable one for building a strong voice biometric print 1715, and for allowing a user to ensure she is comfortable using the phrase. Also, users 1700 are allowed to skip phrase testing if desired. Once phrase testing is complete, enrollment process 1801 starts. Generally, several sessions are required to complete an enrollment task. Each session consists simply of saying the test phrase. In step 1801, the system enters enrollment mode, and proceeds to step 1802, where a check is made to determine whether there is a pending learning process in the system or not. If there is, then in step 1803 a check is made whether user 1700 elected to continue or not; if not, then the system continues as if there were no active learning process, moving to step 1804 where check is made to see whether a user wants to test candidate phrases (to see if they are suitable phrases for use in speaker verification, or not). If user 1700 does elect to test phrases, then in step 1805 she chooses a phrase and tries it (by speaking it so that it can be captured by the mobile device). In some embodiments, some amount of real time feedback is provided while user 1700 is recording a test phrase. For example, while user 1700 is recording, a mobile voice biometrics application according to the invention may show the user 1700 the intensity of the user's voice, a time progress indicator which may provide visual indication of a degree to which recording is sufficient to form a strong voice biometric print 1715. In such a case, for example, red could indicate "not enough yet", yellow could indicate "enough, but it could be better", and green could indicate "that's good . . . this will work!" Note that indicating a net speech time metric in such a fashion may be desirable because one of the most important determinants of whether a voice biometric print 1715 is adequate or not is whether it is built from a sufficiently long speech sample. In step 1806, a determination is made whether the phrase tested is a suitable phrase for speaker recognition (i.e., is it "good quality"). Feedback can be provided to user 1700 at this point, for instance "you should try recording the phrase again", "good phrase", "adequate, but could be better", and so forth. Feedback can comprise information about vocal intensity, for instance if a user 1700 is speaking too softly to adequately assess the quality of a candidate phrase. In some embodiments, a maximum length of recording that will be done while testing a phrase, although a user could interrupt recording before the maximum time has elapsed if desired. It will be appreciated by one having ordinary skill in the art that many tests could be use to make this determination, including but not limited to checking whether sufficient vocal variability is present in the phrase to ensure reasonably accurate distinction of true versus impostor voice (if a phrase has few distinct phonemes, for instance, then it might lack sufficient vocal richness to enable accurate speaker recognition), whether the recording was too noisy to yield good results, whether the phrase is too long (which might cause unneeded delays in processing, especially on a mobile device), and so forth. Other approaches may also be considered, such as checking the number of activated UBM components, or evaluating a distribution of activated UBM components. The idea is to select those phrases with high acoustic variability. Also discrimination of the activated UBM components could be a good measure.

If the result of the quality test is negative (i.e., quality was not good), in step 1807 feedback is provided to user 1700 and execution returns to step 1804. If quality was deemed satisfactory, then execution proceeds directly back to step 1804. If user 1700 does not want to test one or more phrases, or when phrase testing is completed, then the path from step 1804 labeled "No" is taken, and enrollment process 1810 begins with step 1811, by setting a counter (here labeled n) to 1. In step 1802, if there is a pending learning process, execution passes to step 1803 where user 1700 has the option to continue or not. If she elects not to continue to enrollment, then execution moves to step 1804, if user 1700 does elect to continue, execution passes to enrollment process 1810, specifically to step 1812, where n is given the last value it had when enrollment process 1810 was last interrupted (that is, the value which was given during processing of the last audio recording processed). If enrollment process 1810 is entered from step 1811, then in step 1813 a set of accepted phrases is visually displayed on the mobile device; if enrollment process 1810 is entered via step 1812, previously selected phrases are displayed. Then, in step 1814, user 1700 is requested to record one audio prompt for enrollment, and in step 1815 quality of the recording is tested. If the quality is not satisfactory, then in step 1818 feedback is provided to user 1700 and execution returns to step 1814 for a new recording. Generally, feedback in step 1818 is similar to that in step 1807, although feedback on the extent of completion of enrollment process 1810 may also be provided, user 1700 is allowed to elect to delete a previous recording, and user 1700 may be allowed to see the phrase again on a display device of the mobile device being used. Once quality is determined to be good, in step 1815, then execution passes to step 1816, a check is made to see if more sessions are required, for example if more phrases remain to be enrolled on. If yes, then in step 1817 n is incremented and execution returns to step 1814. If no more sessions are required in step 1815, then execution moves to step 1820, and voice biometric print 1715 becomes active. In step 1821, user 1700 may be provided an option to add a picture, such as a photo or avatar of user 1700, and in step 1822 user 1700 is prompted to choose whether to move to a home screen 1823 or to a practice screen or practice session 1824.

In general, during enrollment process 1810, a user 1700 will have to record several repetitions of each phrase in order to complete enrollment process 1810 successfully (number of repetitions is measured by n). Before starting, the mobile voice biometrics application will ask user 1700 to enter a selected phrase. This will be used, among other things, to show the phrase during enrollment process 1810 (or future practice processes), and to help user 1700 to perform audio recording in step 1814 (because it is easier to record consistently when reading a printed phrase from the screen). Additionally, the phrase used will be used to identify a voice biometric print once it is created, and if enrollment process 1810 is not finished it will be displayed when enrollment process resumes. In some embodiments, automated speech recognition may be used to recognize speech being recorded to determine if user 1700 is actually saying the phrase that is displayed.

Practice process 1900 allows user 1700 to test if a mobile device speech biometrics application is able to recognize his voice. Generally, an application will return one of three values: accepted, undecided or rejected, and user 1700 will say it if it was wrong or right. For example, user 1700 says her phrase, the application returns, "Accepted", and user 1700 says "Yes! You were right!"; or the application returns, "Undecided", and user 1700 says "No! You were wrong!"; or a friend of user 1700 enters the required phrase and the application returns, "Rejected", and user 1700 says "Yes! You were right!" Additionally, in some embodiments, each time user 1700 tests an application, the application analyzes the results obtained in order to detect if it is working properly. If not, the application will recommend activating a learning mode, which means that from that point until it leaves learning mode, it will learn from each repetition made by user 1700. When the application considers learning complete, it informs user 1700 and the learning mode is deactivated. There are in general two reasons for failure suggests a learning mode—either voice biometrics is not functioning properly (such as when its model of user's 1700 voice is not adequate), or user 1700 is "playing", such as by disguising her voice to see if she can trick the system. If the second situation occurs, it is not beneficial for practice mode 1900 to learn from it, whereas in the first case practice is beneficial. Thus it is important to be able to distinguish bona fide problems from user 1700 probing or playing.

Figure 19:
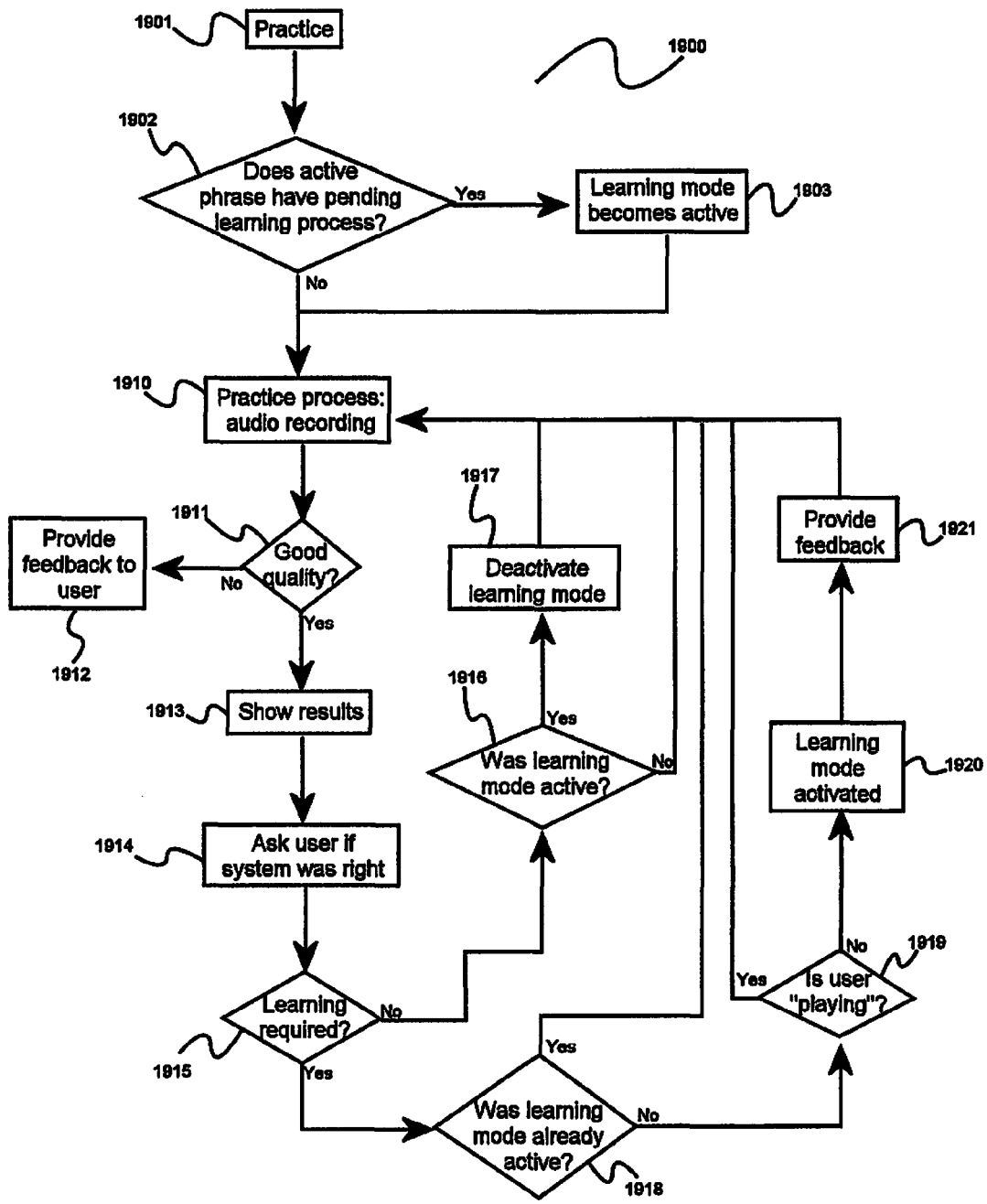
FIG. 19 is a process flow diagram of a practice method, according to a preferred embodiment of the invention.

FIG. 19 is a process flow diagram of practice method 1900, according to a preferred embodiment of the invention. Practice mode 1900 is entered in step 1901, and usually a visual indication is provided to user 1700 that the application is in practice mode 1900. In step 1902, a check is made whether there is an active learning progress pending; if yes, then in step 1903 learning mode becomes active and execution moves to step 1910. Usually in this situation user 1700 is provided some visual or audio feedback indicating learning mode is active, and warning user 1700 that "this is serious" (that is, if user 1700 is careless during learning mode, voice biometric print 1715 quality may suffer, and the user's 1700 mobile device may become insecure). If not (no pending practice mode in step 1902), then execution moves directly from step 1902 to step 1910. In step 1910, user 1700 is prompted to speak a test phrase, and user's 1700 speech is recorded. As in enrollment process 1810, a check of recording quality is made in step 1911; if quality is not adequate, user 1700 is provided feedback to assist in re-recording with good quality. As before, feedback is provided during and after the recording process to help user 1700 make good recordings. Once a recording of good quality is made, in step 1913 results 1725 are displayed (that is, "accepted", "rejected", or "undecided"), and in step 1914 user 1700 is asked whether the application obtained correct results. If user 1700 indicates that learning is required (meaning the system got it wrong) in step 1915, then a check is made in step 1918 whether learning mode was already active. If it was, then execution returns to step 1910 and user 1700 is prompted to record once again. If not, then in a check is made (usually by asking user 1700) whether user 1700 was playing (or, if not, whether the system has a problem). If user 1700 acknowledges he was playing, then he is simply returned to step 1910 to make another recording. If user 1700 says he was serious, then in step 1920 learning mode is activated and in step 1921 feedback about the situation is provided to user 1700 (for instance, "entering learning mode now—remember, this is serious!"). In some embodiments, entering learning mode is done only with consent of user 1700, while in other cases learning mode may be activated automatically (with visual and/or audible indicators to user 1700 that learning mode is now active).

In most embodiments, users in practice mode will always have an option available (generally through an always-available GUI action button) to leave practice mode and return to a home screen. Also, in most embodiments user 1700 will always have an option to exit learning mode and to cancel the last learning process (i.e., the last practice session performed with learning mode active). Generally, user 1700 will be provided with visual prompts showing learning progress throughout each practice session. Also, since multiple voice biometric prints 1715 may be present in systems according to the invention, a user 1700 may at any time change the active voice biometric print 1715. If learning mode was active when this was done, then that practice session would be suspended and its state saved so that, if the voice biometric print being practiced is later made active again, the practice session can be resumed where it left off. This is helpful when a user wishes to develop a very strong voice biometric print 1715, but desires to do so in an incremental process of several practice sessions, and wishes in the meantime to maintain security by using an already-trained voice biometric print 1715.

When audio recordings are collected during practice, they can be used to improve the speaker recognition model, for instance by capturing as much speaker variability as possible. Also, they can be used to improve calibration, for instance by adapting decision thresholds to a particular speaker's vocal characteristics. Furthermore, some components such as a universal background model or a total variability matrix can be improved according to the invention by means of adaptation based on practice results. It is well known in the art that the higher the variability, the better a model will be for speaker recognition. Several approaches can be used to improve an existing model by taking advantage of newly recorded audio from practice sessions. In one embodiment, a new model is created using the new data, while maintaining the previous model, so that several speaker identification systems can proceed to test a given speech sample in parallel, with resulting scores being fused in a follow-up step. In another embodiment, a new model is created by concatenating newly recorded audio recordings and previous recordings, or by concatenating feature vectors extracted from newly recorded audio with the feature vectors of the previous model (this is essentially the same thing as adding first and second order statistics to get a combined model). In this case, no fusion is needed because the previous model is discarded after its data is concatenated with the newly acquired data. In yet another embodiment, a new model is created using the newly acquired data, and the previous model is maintained as well. Both resulting voice biometric prints are introduced into the speaker recognition system. This solution, which is possible in some implementations of the total variability paradigm, usually gives the best results. In general, according to a "total variability" paradigm, there are several ways to use multi session audios to improve the model. One approach, as described, is to concatenate audio; this solution is mathematically equivalent to adding the statistics (zero-order and first-order) or to concatenating the feature vectors. Another approach is to generate as many iVectors as audio samples, to use them independently, and finally to fuse the scores. Yet another approach is to generate as many iVectors as audio samples, and then to use all of them in a PLDA process (comparison between testing and enrolled iVectors). This third solution is usually more accurate but has practical problems (the PLDA is more complex and uncontrolled score shifts can be expected).

Another way to improve speaker recognition accuracy is to use new data acquired during practice sessions to adapt some elements of the system. According to a preferred embodiment of the invention, a speaker identification system is comprised of several sequential modules (as described above with reference to FIG. 12)—a front end module, a statistics computation module (which requires a UBM), an iVector extractor (which requires total variability matrix T and Pre-Matrices), an iVector adaptation module (which usually comprises mean normalization), and a back end module (which is often based on Probabilistic Linear Discriminant Analysis (PLDA) and/or score normalization/calibration). In some embodiments, other modules may be also included. New data could be used in any or all of these modules:

UBM.

A universal background model may be adapted using such basic techniques as maximum a prior (MAP) adaptation), maximum likelihood linear regression adaptation (MLLR), or other adaptation techniques known in the art.

iVector Extractor.

A total variability matrix T may be composed by stacking a default matrix and an adapted one, which may be computed with sparse data.

iVector Normalization.

As noted previously, iVector normalization is usually based on mean subtraction. However, more sophisticated solutions, such as nonlinear transformations, could be used (for example, mean and variance normalization, histogram equalization, discriminative transformations, and the like).

PLDA Adaptation.

Only fully-Bayesian approaches are capable of including a small matched dataset in computation of a PLDA log likelihood, but the approach is very slow.

Score Normalization/Calibration.

Some score normalization techniques are used in the art in speaker recognition systems, such as t-norm, z-norm, and zt-norm. However, the inventors have determined that better results can generally be obtained with s-norm, which is a symmetric normalization technique.

Finally, although in what has been disclosed so far, it has been assumed that all modules can be treated as mutually independent, the real situation is far more complex, as each module depends on the outputs of previous modules. Because of this, complete adaptation techniques that adapt the overall process based on newly acquired data may be used according to an embodiment of the invention.

Figure 20:
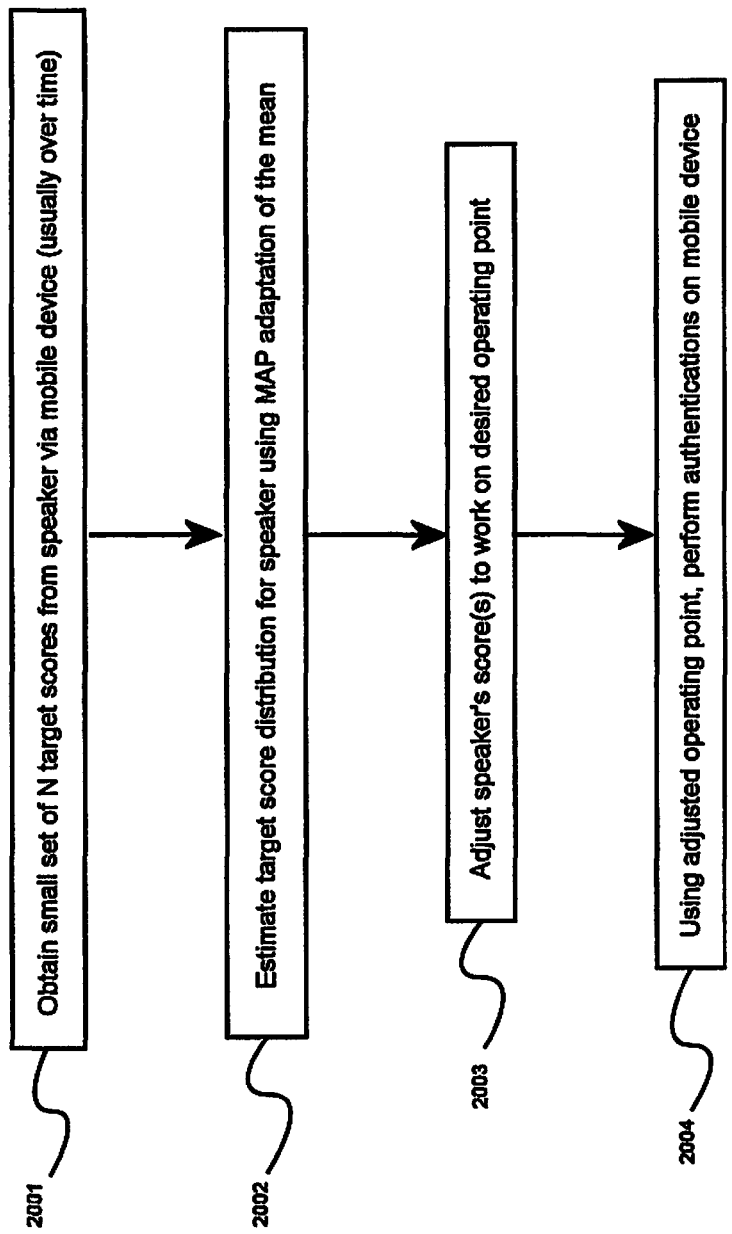
FIG. 20 is a process flow diagram of an improved calibration method, according to an embodiment of the invention.

FIG. 20 is a process flow diagram of an improved calibration method, according to an embodiment of the invention. Generally, it is assumed that a specific speaker's model does not change during operation of the system. However, according to the embodiment, it is possible to take into consideration some testing sessions in order to estimate a target score distribution for the speaker (that is, in order to model the statistics of how speaker recognition scores for a given real speaker will vary as more tests are performed). This approach is useful for making a speaker model more robust, as it will capture variations that may occur when a speaker is stressed, tired, excited, and so forth.

Assuming that we have a small set of $N_{scr}$ target scores obtained from the speaker, we can estimate their distribution, given by $\mu_{scr}, \sigma_{scr}$. Since we do not expect to have several scores to estimate $\sigma_{scores}$ robustly, we assume that only $\sigma_{scores}$ is available. We estimate the target score distribution for the speaker using MAP adaptation of the mean:

$$\mu_{spk,t} = \frac{\tau \mu_{prior,t} + N_{scr}\mu_{scr}}{\tau + N_{scr}}$$

$$\sigma_{spk,t} = \sigma_{prior,t}$$

where we assume that there is a prior on the target score distribution for the speakers, given by $\mu_{prior,t}, \sigma_{prior,t}$. $\tau$ is the "relevance factor" and can be interpreted as the number of samples (target scores) needed to trust $\mu_{scr}$ as much as $\mu_{prior,t}$. According to the embodiment, once an estimate of $\mu_{spk,t}$ is obtained, a speaker score can be adjusted to work on a desired operating point. An offset o is computed for target score distributions with respect to the prior, and then a final speaker score is computed for a given score s as:

$$s' = s - o \text{ and } o = \mu_{spk,t} - \mu_{prior,t}$$

This way thresholds computed on the prior are valid over all speakers (this is equivalent to assuming that target and non-target score distributions have the same shift, which the inventors have determined is reasonable given observed behavior of real speakers' data.

In some embodiments, if many target scores are available, not only the mean of a target distribution is adapted, but also the variance, which provides a more precise transformation. Furthermore, the offset can be limited to avoid large statistical movements, such as could be produced by impostor speakers. Finally, impostor scores may be used to move an impostor statistical distribution independently of a target distribution, and thus a means of controlling false acceptance (FA) and false reject (FR) rates is provided. Considering now FIG. 20, in step 2001 a small set of target scores is obtained from a speaker via a mobile device. Usually this is done over a period of time. In step 2002, an estimate of a target score distribution for the speaker is derived using MAP adaptation of the mean, as just described. Then, in step 2003, the speaker's target scores are adjusted to work on a desired operating point (for instance, a desired overall false accept or false reject rate). Finally, in step 2004, using an adjusted operating point, authentications are performed using the mobile device. Note that this process may be repeated iteratively as more target scores are obtained, to monitor and account for drift in for example mobile device acoustics.

Figure 21:
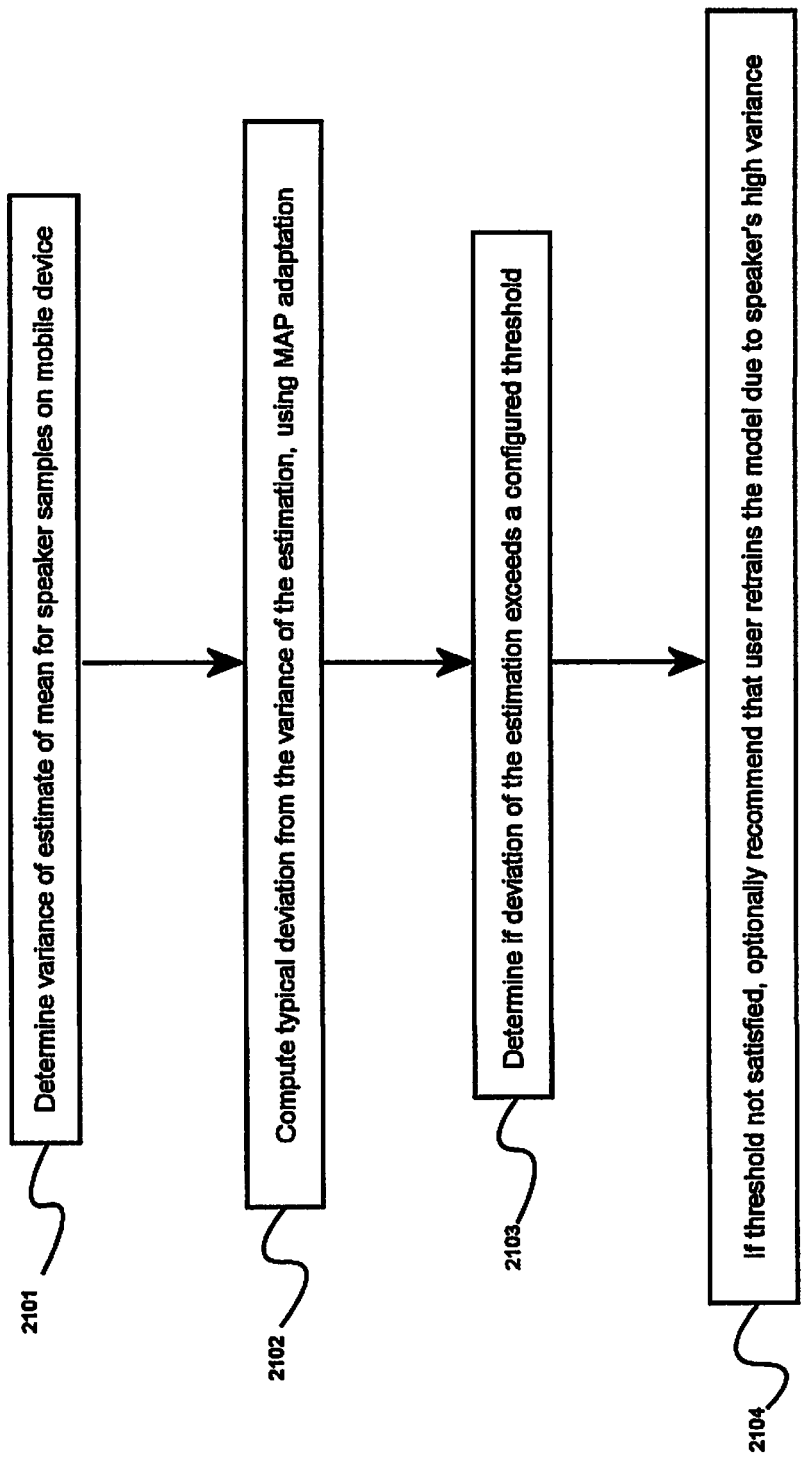
FIG. 21 is a process flow diagram of a method for determining whether a new learning task is completed, according to an embodiment of the invention.

FIG. 21 is a process flow diagram of a method for determining whether a new learning task is completed (that is, for determining when there are enough samples to represent a new environment for which training was conducted), according to an embodiment of the invention. According to the embodiment, use is made of the variance of the estimation of $\mu_{spk}$ to determine when an estimated value of $\mu_{spk}$ is robust enough to be used. In maximum likelihood estimation, the variance of an estimation of the mean is given by:

$$\text{var}(\mu_{scr}) = \frac{\sigma_{scr}^2}{N_{scr}}.$$

According to the embodiment, the estimated mean of interest is $\mu_{spk,t}$, so the variance of the estimation of the mean is given by:

$$\text{var}(\mu_{spk,t}) = \frac{\sum_{n=1}^{N_{scr}} (s_n - \mu_{spk,t})^2}{\frac{N_{scr} - 1}{N_{scr}}}.$$

Considering a prior for the variance of the estimation of $\mu_{scr}$, given by variance of an estimation of $\mu_{prior,t}$ that would be obtained for a set of $N_{scr}$ samples:

$$\text{var}(\mu_{prior,t}) = \frac{\sigma_{prior,t}^2}{N_{scr}}.$$

According to the embodiment, a typical deviation from the variance of the estimation is computed, again using MAP adaptation, using:

$$\sigma_{est} = \sqrt{\frac{\text{var}(\mu_{prior,t})\tau + \text{var}(\mu_{spk,t})N_{scr}}{\tau + N_{scr}}}.$$

The value $\sigma_{est}$ is the typical deviation of the estimation of $\mu_{spk,t}$. In some embodiments, a threshold for this value is set in order to ensure that the mean $\mu_{spk,t}$ is estimated robustly. This value will generally be higher as more variance is present in a speaker's target scores, so in some embodiments it is possible to detect those speakers who present high variance and deal with them appropriately (for instance by prompting them to retrain their model, as described above with reference to FIG. 18.

Referring now to FIG. 21, in step 2101 the variation of an estimate of a mean for a speaker's samples on a mobile device is determined. In step 2102, using MAP adaptation, a typical deviation from the variance of the mean of the estimation is computed. In step 2103, a determination is made whether a deviation of the estimation exceeds a configurable threshold. In step 2104, if the threshold is not satisfied, the system may optionally recommend that user 1700 retrains an associated speaker recognition model due to the speaker's high variance.

Figure 22:
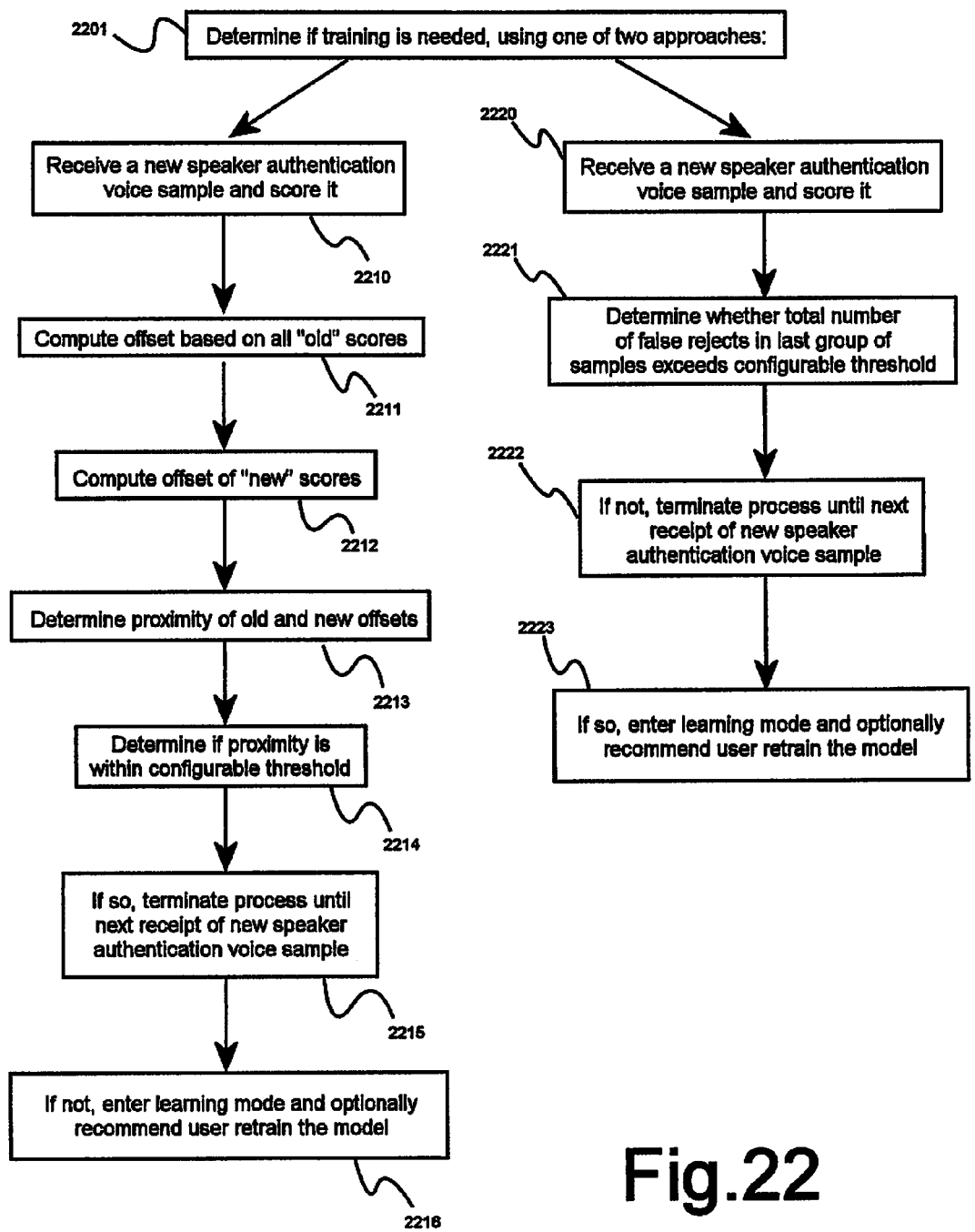
FIG. 22 is a process flow diagram of a method for analyzing behavior of a system and proposing a learning period to a user, according to an embodiment of the invention.

FIG. 22 is a process flow diagram of a method for analyzing behavior of a system and proposing a learning period to a user, according to an embodiment of the invention. In general, one problem that can arise in speaker authentication systems is that it may become necessary to refine a system by conducting one or more learning sessions when, for example, changes to channel acoustic characteristics make authentication results less reliable. In a first step 2201, a determination is made whether a new learning period is need to refine a speaker authentication mode, using one of at least two approaches. In a first approach, based on offset proximity, in step 2210 a new speaker authentication voice sample is received and scored as described above. Then, in step 2211, an offset is computed based on all "old" learning scores; that is, a computation is conducted to determine an average offset for a previous score from an overall mean value. Then, in step 2212, an offset is computed for "new" scores, which may variously be simply the newly-obtained score, or some set of recently-obtained scores. Then, in step 2212, a proximity measurement comparing the old and new offsets is carried out, for example using:

$$\frac{|\text{offset}_{new} - \text{offset}_{old}|}{\sigma_{est,new}/k} > 1 \Rightarrow \text{we need learning}$$

where $\text{offset}_{new}$ and $\sigma_{new}$ are determined with based on new target scores, for example using sliding window of R=5 scores (R is a configuration variable, 5 by default, although clearly other values may be used according to the invention), and k is a configuration parameter which could be used to provide a smooth or "nervous" solution (lower k, smoother solution). In step 2214, a determination is made as to whether the computed proximity is within a configurable threshold (for instance, in the equation shown, the threshold is 1). If so, then in step 2215 the process is terminated until a subsequent speaker authentication voice sample is received, at which point the process starts over again at step 2210. If the computed proximity is not within the configured threshold, then in step 2216 the system enters a learning mode and recommends that the user should retrain the model (which enrollment/learning process is described above with reference to FIG. 18).

In a second approach based on analyzing the operating point of the system to determine if it is operating as desired, in step 2220 a new speaker authentication voice sample is received and scored as described above. Then, in step 2221, a determination is made as to whether the total number of false rejects in a last group of samples (group size being configurable) exceeds some configured threshold value. If the total number FR of false rejects does not exceed the threshold, then in step 2222, the process is terminated until a subsequent sample is received for speaker recognition, at which point the process repeats starting at step 2220. On the other hand, if the number FR is above the configured threshold, then in step 2223 the system enters a learning mode and could recommend that the user should re-enroll the model. The second approach outlined here may be very useful when there are few target scores, so that we do not have enough precision to estimate the accuracy of the system as required in the first method using offsets. Note that this approach only measures the FR and it would generally be useful only when a current distribution of target scores is lower than one we computed in the past. On the contrary, non-target scores should be used. Thus, we could use the working point estimation as a second check. In fact, it could be interesting for user perception. We fix k in [167] at 2 and it should depend on the working point (lower FR, lower k).

Figure 23:
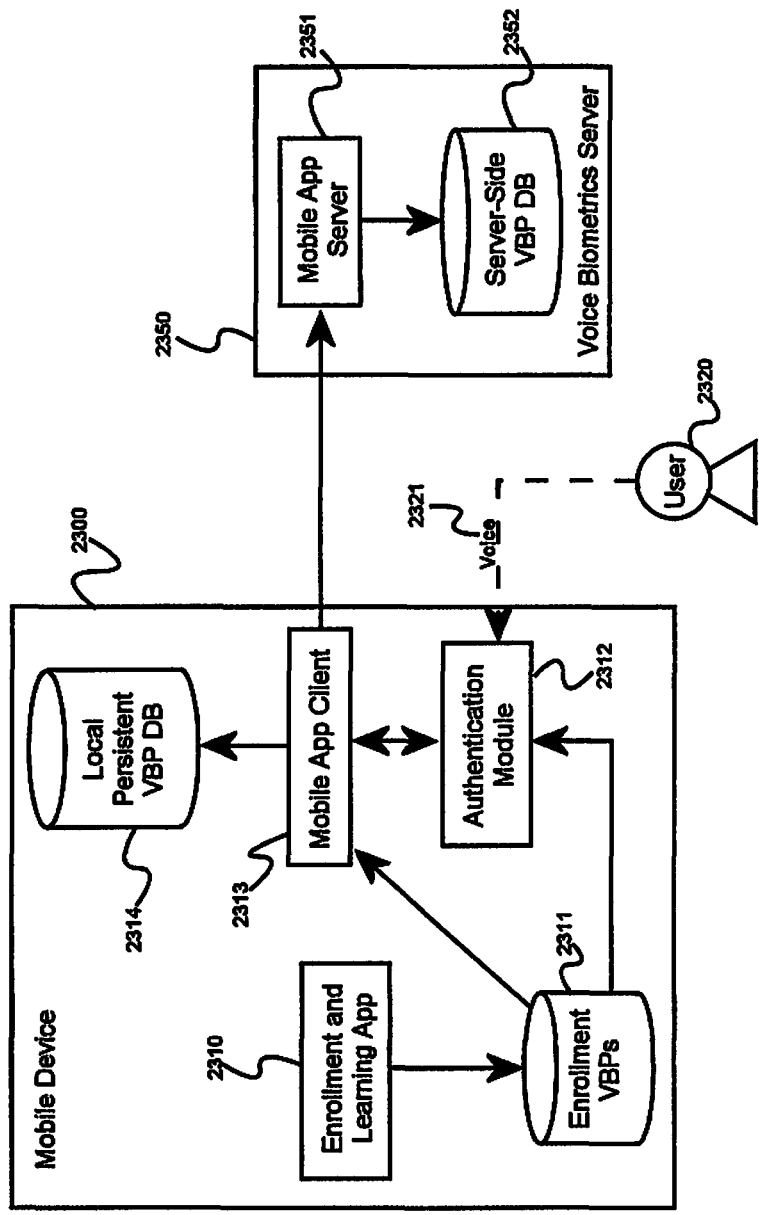
FIG. 23 is a system diagram of an embodiment of the invention according to which a mobile device user is provided positive control of the distribution of the user's voice biometric prints.

FIG. 23 is a system diagram of an embodiment of the invention according to which a user of a mobile device 2300 is provided positive control of the distribution of the user's voice biometric prints. According to the embodiment, an enrollment and learning application 2310 is provided on mobile device 2300, operating according to the various embodiments described above. When a user enrolls and establishes one or more voice biometric prints, the resulting VBPs are stored initially in enrollment VBP database 2311. Then, either at the request of a mobile application client 2313 or at the direction of a user 2320, authentication module 2312 performs a voice biometric authentication of user 2320 to ensure that only a specific user 2320 is allowed to access his or her VBPs stored in enrollment VBP database 2311, and then the authenticated user 2320 may provide authorization for application 2313 to retrieve and use one or more voice biometric prints associated with the authorizing user 2320. Additionally, user 2320 is typically required to authenticate using authentication module 2312 before an enrollment VBP is passed to persistent VBP storage, which may either comprise local persistent VBP database 2314, server side VBP database 2352, or both. In some embodiments, authentication of a user desiring to use mobile application client 2313 is performed on the server side by mobile application server 2351, using server side VBP database 2352 as a repository of voice biometric prints; in other embodiments, authentication for application 2313 may be carried out entirely within mobile device 2300 through use of authentication module 2312 and local persistent VBP database 2314. It will be appreciated by one having ordinary skill in the art that various combinations of server side and client side functionality may be used according to the invention. An important aspect of these embodiments is that, by using authentication module 2312 at enrollment time and at application authorization time (that is, when authorizing a third party application 2313 to carry out voice authentication of user 2320), user 2320 is given positive control over when and how her voice biometric print may be accessed and utilized.

FIG. 24 is a process flow diagram of a method for allowing a user to transfer a selected voice biometric print to a third party application or device, according to an embodiment of the invention. In an initial step 2401, a local voice biometric print for a user is generated using an enrollment process described above (possibly a learning process may be also be used). Then in step 2402 a list of enrollment voice biometric prints stored locally is generated. In step 2403, a mobile device voice authentication client application 2313 receives the list, either as a result of explicitly fetching it or because it is automatically or periodically transmitted to one or more eligible mobile device client applications 2313. Then, when a user selects "send to server" after creating, modifying, or otherwise approving a voice biometric print, in step 2404 the user 2320 is authenticated by an authentication module 2312, and in step 2405, if authentication was successful, in step 2406 the selected voice biometric print is activated and is thereafter available for use by authorized applications 2313 for authenticating the user. Finally, in step 2407, the selected voice biometric print is stored in either a local VBP database 2314 or a server-side VBP database 2352. Again, the process illustrated in FIG. 24, using a system such as that shown in and described with reference to FIG. 23, will in general provide a very robust means for allowing user 2320 to exercise positive control over the distribution and the use of any voice biometric prints, and thereby will tend to increase the level of trust felt by mobile device users in biometric authentication.

The skilled person will be aware of a range of possible modifications of the various embodiments described above. Accordingly, the present invention is defined by the claims and their equivalents.

What is claimed is:

1. A method of operation of a speaker recognition system, comprising:
   setting predetermined statistical characteristics of speech recognition scores of voice samples;
   receiving a plurality of voice samples from a user;
   setting adjusted statistical characteristics of speech recognition scores for said user based on said predetermined statistical characteristics and on speech recognition scores of the received voice samples;
   setting an operating point for the speaker recognition system based on the adjusted statistical characteristics;
   using said operating point for performing speaker authentication for said user;
   determining a first offset value based on scores assigned to previously received voice samples from said user;
   determining a second offset value for a score based on at least one recently received voice sample from said user;
   determining whether a difference between said second offset value and said first offset value exceeds a proximity threshold; and
   if said difference exceeds the proximity threshold, determining that further system training is required;
   wherein the predetermined statistical characteristics of speech recognition scores comprise a predetermined mean score.

2. A method as claimed in claim 1, wherein setting adjusted statistical characteristics of speech recognition scores for said user based on said predetermined statistical characteristics and on speech recognition scores of the received voice samples comprises setting an adjusted mean score for said user based on said predetermined mean score and on mean speech recognition scores of the received voice samples.

3. A method as claimed in claim 2, wherein setting the adjusted statistical speech characteristics comprises at least one of: setting an adjusted mean score using maximum a prior (MAP) adaptation of the mean, and/or setting an adjusted variance of the score using MAP adaptation of the variance.

4. A method as claimed in claim 1, wherein the adjusted statistical characteristics of speech recognition scores for said user comprise an adjusted mean score, and wherein setting an operating point for the speaker recognition system comprises:
   calculating an offset value as the difference between the adjusted mean score and the predetermined mean score, and
   subtracting the offset value from scores of subsequently received voice samples.

5. A method as claimed in claim 1, wherein the at least one recently received voice sample is the most recently received voice sample.

6. A method as claimed in claim 1, wherein the at least one recently received voice sample is a number of the most recently received voice samples including the most recently received voice sample.

7. A method as claimed in claim 6, comprising calculating said proximity threshold based a standard deviation of scores of said number of the most recently received voice samples.

8. A method as claimed in claim 6, wherein the number of the most recently received voice samples is configurable.

9. A method as claimed in claim 1, wherein the predetermined statistical speech characteristics of speech recognition scores further comprise a standard deviation from the predetermined mean score.

10. A method as claimed in claim 1, comprising setting the operating point based on a desired false acceptance rate.

11. A method as claimed in claim 1, comprising setting the operating point based on a desired false rejection rate.

12. A method as claimed in claim 1, comprising receiving said plurality of voice samples from the user over a plurality of testing sessions.

13. A method as claimed in claim 1, comprising receiving said plurality of voice samples from the user in a mobile communications device, and performing the method in said mobile communications device.

14. A method as claimed in claim 1, further comprising:
 determining a degree of variability of the received voice samples from the user;
  determining whether said degree of variability of the received voice samples exceeds a threshold value; and
  if said degree of variability of the received voice samples exceeds said threshold value, indicating to the user that the user's training of the speaker recognition system is inadequate.

15. A method as claimed in claim 14, wherein the degree of variability is a statistical variance or standard deviation of an estimation of the mean of scores assigned to the received plurality of voice samples.

16. A method as claimed in claim 1, further comprising:
 determining whether a number of false rejections in a recent set of received voice samples exceeds a threshold value; and
 if the number of false rejections in the recent set of received voice samples exceeds the threshold value, indicating to the user that further system training is required.

17. A method as claimed in claim 16, wherein the threshold value is configurable.

18. A method as claimed in claim 16, wherein the number of received voice samples in said recent set of received voice samples is configurable.

19. A method as claimed in claim 1, further comprising:
 while receiving said plurality of voice samples from the user, providing feedback to the user.

20. A method as claimed in claim 19, wherein said feedback comprises an indication as to whether the received plurality of voice samples provide a satisfactory voice biometric print for the speaker recognition system.

21. A method as claimed in claim 1, comprising a practice mode, comprising:
 receiving at least one practice voice sample;
 performing speaker authentication to determine whether the practice voice sample was provided by said user;
 outputting a result of said speaker authentication; and
 receiving feedback from the user indicating whether the output result of the speaker authentication was correct.

22. A communications device, comprising a speaker recognition system, wherein the speaker recognition system comprises:
 (a) an enrolment and learning application, wherein the enrolment and learning application is configured for:
  (i) setting predetermined statistical characteristics of speech recognition scores of voice samples;
  (ii) receiving a plurality of voice samples from a user;
  (iii) setting adjusted statistical characteristics of speech recognition scores for said user based on said predetermined statistical characteristics and on speech recognition scores of the received voice samples; and
  (iv) setting an operating point for the speaker recognition system based on the adjusted statistical characteristics; and
 (b) an authentication module, wherein the authentication module is configured for:
  using said operating point for performing speaker authentication for said user;
  determining a first offset value based on scores assigned to previously received voice samples from said user;
  determining a second offset value for a score based on at least one recently received voice sample from said user;
  determining whether a difference between said second offset value and said first offset value exceeds a proximity threshold; and
  if said difference exceeds the proximity threshold, determining that further system training is required;
 wherein the predetermined statistical characteristics of speech recognition scores comprise a predetermined mean score.

23. A computer program product, comprising a non-transitory computer-readable medium having stored thereon instructions for causing a processor to perform a method comprising:
 setting predetermined statistical characteristics of speech recognition scores of voice samples;
 receiving a plurality of voice samples from a user;
 setting adjusted statistical characteristics of speech recognition scores for said user based on said predetermined statistical characteristics and on speech recognition scores of the received voice samples; and
 setting an operating point for the speaker recognition system based on the adjusted statistical characteristics;
 using said operating point for performing speaker authentication for said user;
 determining a first offset value based on scores assigned to previously received voice samples from said user;
 determining a second offset value for a score based on at least one recently received voice sample from said user;
 determining whether a difference between said second offset value and said first offset value exceeds a proximity threshold; and
 if said difference exceeds the proximity threshold, determining that further system training is required;

wherein the predetermined statistical characteristics of speech recognition scores comprise a predetermined mean score.

* * * * *

UNITED STATES PATENT AND TRADEMARK OFFICE
CERTIFICATE OF CORRECTION

PATENT NO. : 9,917,833 B2
APPLICATION NO. : 14/720712
DATED : March 13, 2018
INVENTOR(S) : Gomar It is certified that error appears in the above-identified patent and that said Letters Patent is hereby corrected as shown below:

In the Specification

In Column 1, Line 9, delete "2012," and insert -- 2012, now Pat. No. 9,042,867, --, therefor.

In Column 1, Line 9, delete "priority U.S." and insert -- priority from U.S. --, therefor.

In Column 2, Line 11, delete "a implemented" and insert -- implemented --, therefor.

In Column 3, Line 20, delete "refereed" and insert -- referred --, therefor.

In Column 3, Line 24, delete "AOL™." and insert -- AOL™, --, therefor.

In Column 5, Line 64, delete "and" and insert -- and (c) --, therefor.

In Column 12, Line 33, delete "a enrollment" and insert -- an enrollment --, therefor.

In Column 13, Line 30, delete "other wise." and insert -- otherwise. --, therefor.

In Column 14, Line 60, delete "by any one" and insert -- by anyone --, therefor.

In Column 15, Line 2, delete "identification" and insert -- identification" --, therefor.

In Column 19, Line 47, delete "Bluetooth™" and insert -- Bluetooth™, --, therefor.

In Column 20, Lines 65-66, delete "operating system 210." and insert -- operating system 220. --, therefor.

In Column 23, Line 34, delete "encoding)" and insert -- coding) --, therefor.

In Column 28, Line 11, delete "factors." and insert -- factors). --, therefor.

Signed and Sealed this
Second Day of October, 2018

Andrei Iancu
*Director of the United States Patent and Trademark Office*

In Column 28, Lines 59-60, delete "UBM matrix 1213" and insert -- UBM matrix 1212 --, therefor.

In Column 31, Line 25, delete "form which" and insert -- from which --, therefor.

In Column 32, Line 61, delete "a enrollment" and insert -- an enrollment --, therefor.

In Column 33, Line 31, delete "move 1740" and insert -- move 1741 --, therefor.

In Column 34, Line 8, delete "work!"" and insert -- work!". --, therefor.

In Column 34, Line 26, delete "use to" and insert -- used to --, therefor.

In Column 35, Line 44, delete "right!"" and insert -- right!". --, therefor.

In Column 37, Line 55, delete "adaptation)," and insert -- adaptation, --, therefor.

In Column 38, Line 55, delete "(this" and insert -- this --, therefor.

In Column 39, Line 65, delete "(for" and insert -- for --, therefor.

In Column 40, Line 31, delete "step 2212," and insert -- step 2213, --, therefor.

In Column 40, Line 39, delete "$\sigma_{new}$" and insert -- $\sigma_{est,new}$ --, therefor.